US007787525B1

(12) United States Patent
Clark, Jr. et al.

(10) Patent No.: US 7,787,525 B1
(45) Date of Patent: Aug. 31, 2010

(54) METHOD AND APPARATUS FOR TRANSMISSION OF WELL-BORE DATA ON MULTIPLE CARRIER FREQUENCIES

(75) Inventors: Lloyd D. Clark, Jr., Cedar Park, TX (US); Joseph M. Steiner, Jr., Austin, TX (US); Suzanne D. Richardson, Austin, TX (US); Ramon Hernandez-Marti, Austin, TX (US); Terry L. Mayhugh, Round Rock, TX (US); Bart J. Bombay, Austin, TX (US); John A. Booker, Austin, TX (US); Gilbert R. Martinez, Georgetown, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1099 days.

(21) Appl. No.: 09/471,659

(22) Filed: Dec. 24, 1999

(51) Int. Cl.
*H04B 13/02* (2006.01)
(52) U.S. Cl. .............. 375/218; 702/6; 702/7; 340/855.4
(58) Field of Classification Search .......... 375/218, 375/234, 259, 260, 261; 340/855.4, 854.9; 166/313; 702/7; 379/314
See application file for complete search history.

(56) References Cited

U.S. PATENT DOCUMENTS

| 4,490,788 A | * | 12/1984 | Rasmussen ............... 710/21 |
| 4,868,569 A |   | 9/1989  | Montgomery |
| 5,365,229 A | * | 11/1994 | Gardner et al. .......... 340/855.4 |
| 5,387,907 A |   | 2/1995  | Gardner et al. |
| 5,673,290 A |   | 9/1997  | Cioffi |
| 5,812,599 A | * | 9/1998  | Van Kerckhove ........ 375/260 |
| 5,832,387 A | * | 11/1998 | Bae et al. ............... 455/522 |
| 5,838,727 A |   | 11/1998 | Lyon et al. |
| 6,124,898 A | * | 9/2000  | Patel et al. ............. 348/607 |

(Continued)

FOREIGN PATENT DOCUMENTS

EP  0 753 948 A  1/1997

(Continued)

OTHER PUBLICATIONS

Saarela,K., "ADSL", Tampere University of Technology, Telecommunication Laboratory, Tampere, Finland, Feb. 17, 1995, pp. 1-20.

(Continued)

*Primary Examiner*—Curtis B Odom
(74) *Attorney, Agent, or Firm*—Pehr B. Jansson; Michael L. Flynn; Jody Lynn DeStefanis

(57) ABSTRACT

A wireline telemetry system and method of transmitting data on multiple carrier frequencies. The system and method adjust power level and number of bits-per-carrier to optimally or near-optimally utilize the capacity of the wireline cable. Due to the nature of wireline telemetry the overall power level is restricted only by the output capability of the downhole telemetry cartridge and the input power restrictions of the uphole telemetry unit receiver. The optimal power level is determined during a training sequence and is a function of such factors as cable length, cable material, cable temperature and cable geometry. The uplink and downlink transmission are executed using different modulation techniques.

46 Claims, 12 Drawing Sheets

U.S. PATENT DOCUMENTS

| | | | |
|---|---|---|---|
| 6,292,559 B1 * | 9/2001 | Gaikwad et al. | 379/417 |
| 6,473,438 B1 * | 10/2002 | Cioffi et al. | 370/468 |
| 6,493,395 B1 * | 12/2002 | Isaksson et al. | 375/261 |
| 6,496,636 B1 * | 12/2002 | Braiman et al. | 385/129 |
| 6,522,731 B2 * | 2/2003 | Matsumoto | 379/93.08 |
| 6,529,710 B1 * | 3/2003 | Lindemann et al. | 455/69 |
| 6,647,058 B1 * | 11/2003 | Bremer et al. | 375/222 |
| 6,714,520 B1 * | 3/2004 | Okamura | 370/286 |
| 6,798,735 B1 * | 9/2004 | Tzannes et al. | 370/207 |

FOREIGN PATENT DOCUMENTS

| | | | |
|---|---|---|---|
| EP | 0 955 744 A | 11/1999 | |
| WO | 99 33215 A | 7/1999 | |

OTHER PUBLICATIONS

Kempainen, S., "The End of the Wait for Home Internet?", EDN Magazine Oct. 10, 1996, pp. 53-70.

Baines, R., "Designing ADSL Devices", Communication Systems Design Magazine, Nov. 1996, pp. 32-41.

Analog Devices, Whitepaper, "AD20msp910 ADSL Chipset from Analog Devices", http://www.analog.com/library/whitepapers/dsp/index.html, 1995-1998, pp. 1-3.

Bingham, J.A.C., "Multicarrier Modulation for Data Transmission: An Idea Whose Time Has Come", IEEE Communications Magazine, US, IEEE Service Center, Piscataway, NJ., vol. 28, No. 5, May 1, 1990.

* cited by examiner

METHOD AND APPARATUS FOR TRANSMISSION OF WELL-BORE DATA ON MULTIPLE CARRIER FREQUENCIES

TECHNICAL FIELD

This invention relates in general to the field of transmission of data from a well-logging tool to a data acquisition system over an electrical cable, and in particular, to a method and apparatus for transmitting well-logging data at multiple carrier frequencies.

BACKGROUND OF THE INVENTION

Accurate and rapid collection and distribution of geophysical property data is a key to successful exploration and production of petroleum resources. Based on data such as electrical and nuclear properties collected in a well-bore, as well as the propagation of sound through a formation, geophysicists make an analysis useful in making many important operational decisions. The analysis includes determination of whether a well is likely to produce hydrocarbons, whether to drill additional wells in the vicinity of an existing well, and whether to abandon a well as being unproductive. Geophysicists may also use well-bore data to select where to set casing in a well and to decide on how to perforate a well to stimulate hydrocarbon flow. One method of collecting well-bore geophysical properties is by way of well-logging. In well-logging, a well-logging tool (also often referred to as a sonde) is lowered into a well-bore on an electrical cable, the wireline. The well-logging tool is an electrically powered measurement device that may, for example, collect electrical data, sonic waveforms that are propagated through the surrounding formation, or radioactivity counts. These measurements are usually converted to a digital form and transmitted on the wireline. Systems for transmitting data from the well-logging tool to a data acquisition system over a wireline cable are known as wireline telemetry systems.

One prior art wireline telemetry system is the Digital Telemetry System of Schlumberger Technology Corporation. U.S. Pat. No. 5,838,727 describes DTS. DTS, like other prior art wireline telemetry systems, transmits data from the logging tool to the surface computer using a single carrier frequency. Using this single carrier system, the maximum throughput is approximately 500,000 bits per second. Modern logging tools are capable of generating data at much higher rates. Therefore, the prior art telemetry systems present a bottleneck in the delivery of well-logging data.

Wireline cables are primarily designed for mechanical properties. A modern oil well may be drilled to a depth of in excess of 30,000 feet. The cable must be able to sustain the tension generated from the weight of the logging tools and the weight of the lengthy cable itself. Electrical properties, on the other hand, are given a lower priority. Therefore, wireline cables are not ideal conveyors of the information that is transmitted from the well-logging tools. It is desirable to provide wireline telemetry systems that can be tailored for specific or individual cables and conditions to maximally use the data delivery capabilities of a specific wireline cable.

Using a formula, known as Shannon's capacity formula, it is possible to determine a theoretical maximum channel capacity of a communication channel given a certain level of noise. Prior art well-logging telemetry systems achieve data rates that are considerably lower than the theoretical capacity. While it may not be practical (or even possible) to build a system that does achieve the Shannon capacity, it is nevertheless desirable to provide a system that achieves a data rate that comes as close as possible to the Shannon capacity for a given wireline cable.

Because of the electrical limitations on a wireline cable, the signal-to-noise ratio can be unacceptably high and significantly impact the data rate. It would be desirable to provide a system and method which overcomes the signal-to-noise ratio problems associated with wireline telemetry systems.

From the foregoing it will be apparent that there is still a need for a way to obtain a higher throughput in a wireline telemetry system and to have a telemetry system that is more adaptable to the specific characteristics of the wireline cable.

The problem of obtaining high data throughput in a communications system also exists in Internet communication. One recently popular technology for high-speed Internet is known as ADSL (Asymmetric Digital Subscriber Line). One modulation technique used in ADSL is Discrete Multi-Tone modulation (DMT). An advantage of ADSL is the high throughput. With ADSL it is possible to obtain a data rate of over 4.5 million bits per second on a twisted-pair telephone line.

Hitherto DMT has not been used in wireline telemetry systems because of inherent difficulties in applying DMT to wireline. These difficulties arise in part from high signal attenuation on wireline cables. It would be advantageous to overcome the problems of applying DMT to wireline telemetry and thereby obtain the benefits of ADSL and DMT in well-lagging data acquisition.

SUMMARY OF THE INVENTION

The deficiencies in the prior art are solved in the present invention which, in a preferred embodiment, provides a wireline telemetry system in which multiple carrier frequencies are used. The system thereby provides much greater throughput than prior art wireline telemetry systems. In one aspect of the invention, a telemetry system transmits well-logging data from at least one downhole tool to a surface data acquisition system. The telemetry system includes logic to cause transmission of the bitstream as analog signals on a plurality of carrier frequencies. An uphole telemetry unit is connected to the surface data acquisition system via an acquisition computer interface and consists of a receiver connected to the surface data acquisition system and having logic operable to receive the analog signals on the plurality of carrier frequencies, to demodulate the received signals into a bitstream, and to output the bitstream to the acquisition computer via the acquisition computer interface.

In one embodiment of the invention, the sampling rate at which the telemetry system transmits data on the wireline cable is adjusted to the characteristics of the wireline cable. For example, in the preferred embodiment the sampling rate is set in a range of 300 kHz to 500 kHz.

Similarly, the power level of each carrier frequency is set to optimize the overall power level transmitted. A training sequence is employed by the telemetry system in which a known signal at a known power level is transmitted. The uphole receiver responds to the downhole telemetry cartridge by indicating whether the power level can be adjusted to obtain an optimal transmission. The downhole telemetry unit in response adjusts the overall power level. The uphole receiver then indicates appropriate power adjustments for each carrier frequency. The power adjustment is made without consideration for cross-talk to other signals.

Similarly, the input bit stream from an acquisition tool is broken up into bit groups which are individually modulated. Using the received signal-to-noise ratio, the uphole receiver indicates to the downhole telemetry unit how many bits-per-carrier are to be used to maximize throughput. The bits-per-carrier information is stored in bits-per-carrier tables in both the downhole telemetry cartridge and in the uphole telemetry unit.

According to a preferred embodiment of the invention, uphole and downhole signals are simultaneously transmitted using different propagation modes. In an alternative embodiment, the same set of physical wires is used for both uphole and downhole transmission in different propagation modes. Alternatively, the same propagation mode is used in both directions.

According to a preferred embodiment, multi-carrier modulation is used in the uplink transmission of data and bi-phase modulation is used in the downlink transmission.

Another aspect of the present invention is a method of operating a well-logging telemetry system having a downhole telemetry cartridge and an uphole telemetry unit connected by a wireline cable. According to the method, the well-logging telemetry system is operated to execute the steps of modulating a bit stream onto a plurality of carrier frequencies; transmitting the modulated bit stream on a first propagation mode from the downhole telemetry cartridge to the uphole telemetry unit; and operating the uphole telemetry unit to demodulate the received bitstream.

A training sequence of the method populates a bit-per-carrier table at both the uphole telemetry unit and the downhole telemetry cartridge. The bits-per-carrier are determined as a function of signal-to-noise ratio. Furthermore, a training sequence populates a gain table at both the uphole telemetry unit and the downhole telemetry cartridge. The gain tables are also populated as a function of signal to noise ratio.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENTS

Figure 1:
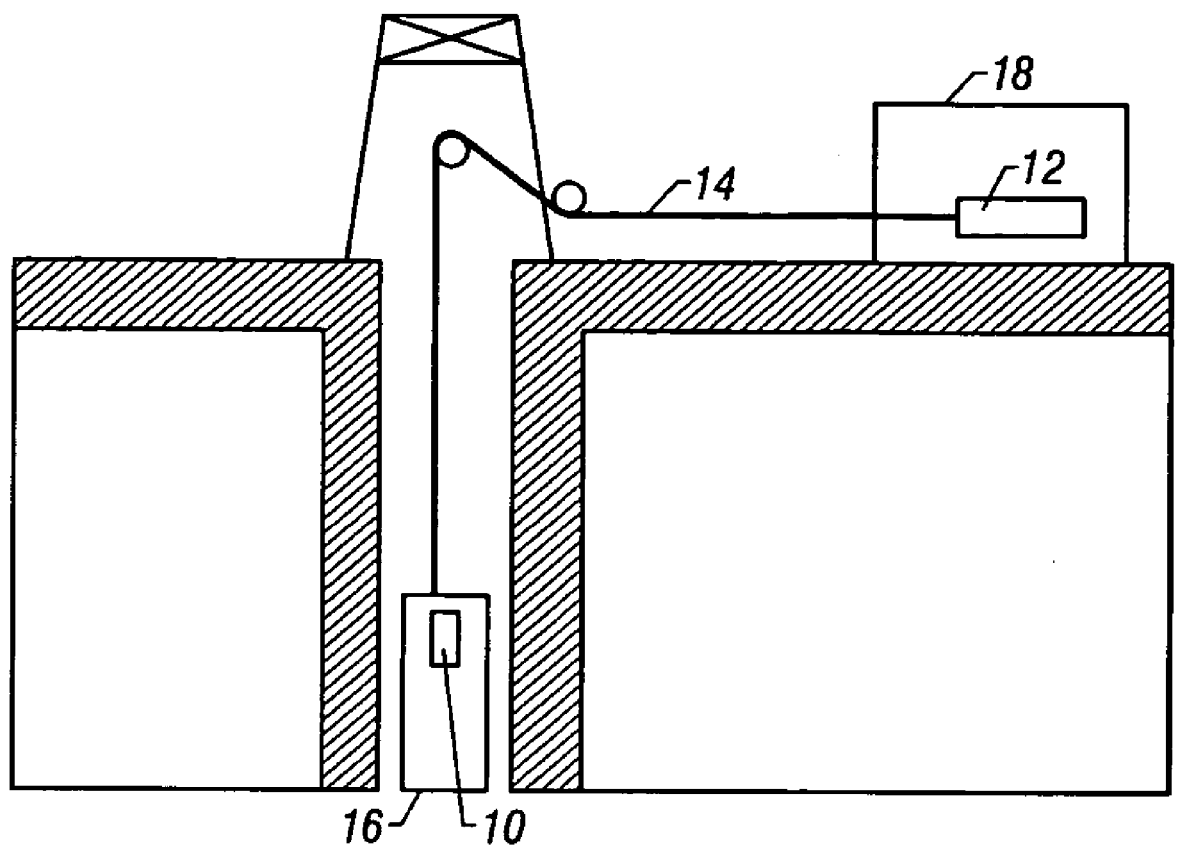
FIG. 1 is a schematic diagram illustrating a well-logging operation including application of the present invention.

In the following detailed description and in the several figures of the drawings, like elements are identified with like reference numerals.

A note on conventions used herein, "downlink" and "uplink" refer to the direction in which data is transmitted along a wireline cable, whereas "uphole" and "downhole" refer to locations of equipment. Thus, "uphole equipment" means equipment that is located at the surface of a logging job and "downhole equipment" refers to equipment located at the logging tool end of the wireline. The preceding note is for explanatory purposes and should not be used to limit the scope of the invention.

I. Overview of Wireline Telemetry System According to the Invention

As shown in the drawings for purposes of illustration, the invention is embodied in a novel well-logging telemetry system for transmitting well-bore data from logging tools to a data acquisition system on the surface. A system according to the invention provides for multi-carrier transmission of well-logging data and dynamic adjustment of power level and modulation constellation on each carrier thereby achieving an improved overall data rate.

In the drawings, a preferred embodiment wireline logging application is illustrated. As shown in FIG. 1, a downhole telemetry cartridge 10 is connected to a well-logging tool 16. In a well-logging operation often several tools 16 are connected into a tool string. The tools 16 communicate with the downhole telemetry circuits 10 via a bi-directional electrical interface. Typically the tools 16 are connected to the telemetry cartridge 10 over a common data bus. Alternatively, each tool may be directly connected to the telemetry cartridge 10. In one embodiment the telemetry cartridge 10 is a separate unit which is mechanically and electrically connected to the tools in the tool string. In an alternative embodiment, the telemetry cartridge is integrated into the housing of one of the well-logging tools 16.

Figure 2:
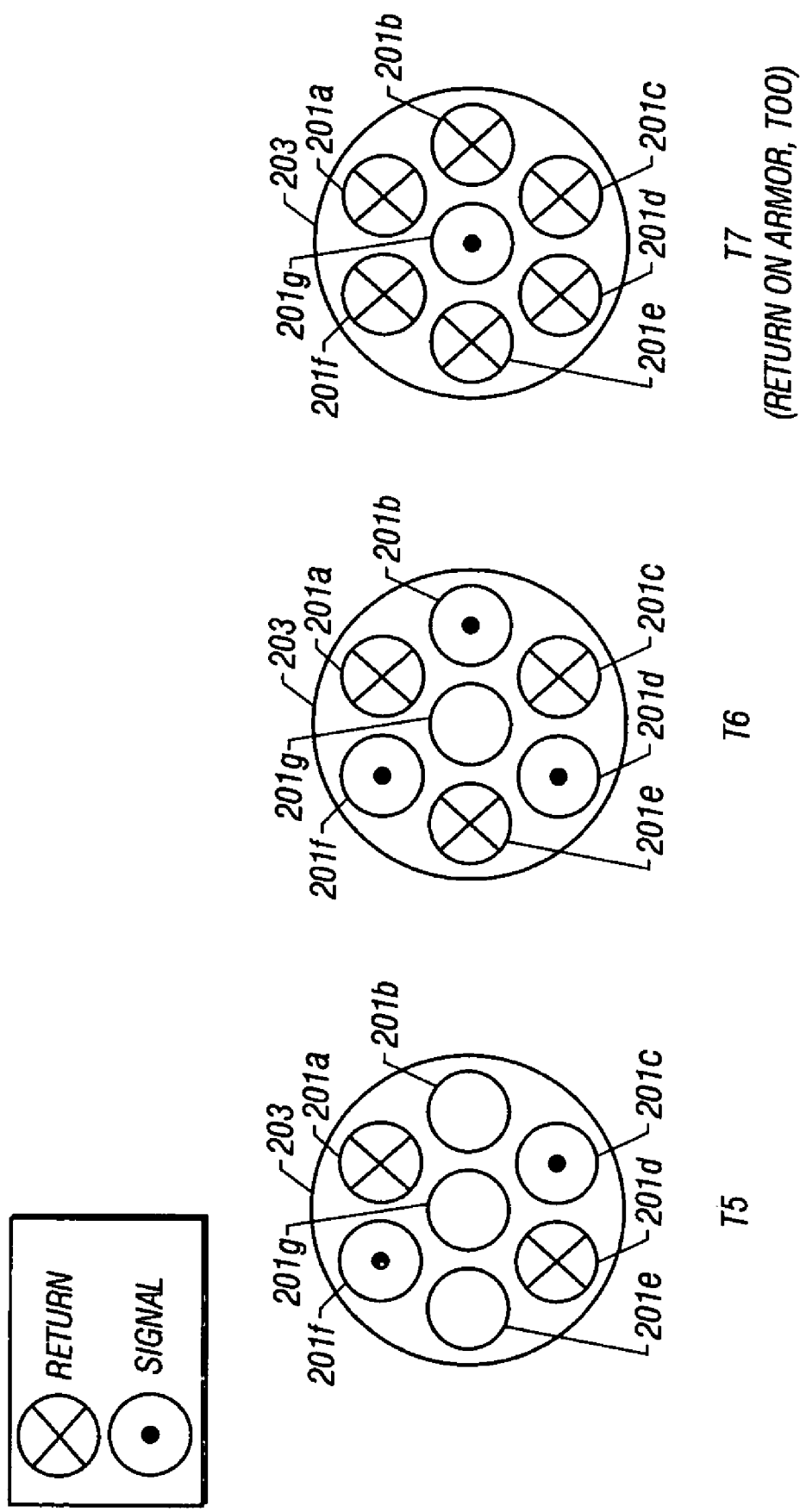
FIG. 2 is a schematic illustration of three propagation modes used on a wireline cable used in a well-logging operation as shown in FIG. 1.

The telemetry cartridge 10 is connected to a wireline cable 14. The tools 16, including the telemetry cartridge 10, are lowered into a well-bore on the wireline cable 14. In the preferred embodiment the wireline cable 14 is a heptacable. A heptacable consists of seven conductors—a central conductor surrounded by six conductors and an outer steel armor. A heptacable provides for several different signal propagation modes, each of which transmits signals on a specific combination of the seven conductors. FIG. 2 is an illustration of the T5, T6, and T7 propagation modes. In the T5 mode, the signal is propagated on conductors 201$c$ and 201$f$, and the return is provided on conductors 201$a$ and 201$d$. In the T6 mode, the signal is propagated on conductors 201$b$, 201$d$, and 201$f$, and the return is on conductors 201$a$, 201$c$, and 201$e$. In the T7 mode, the signal is propagated on conductor 201$g$ and the return is on conductors 201$a$-201$f$ and on the surrounding armor 203.

A surface data acquisition computer 18 is located at the surface end of the wireline cable 14. The data acquisition computer 18 includes an uphole telemetry unit 12. The data acquisition computer 18 provides control of the tools and processing and storage of the data acquired by the tools. The acquisition computer 18 communicates with the uphole telemetry unit 12 via a bi-directional electrical interface.

The uphole telemetry unit 12 modulates downlink commands from the acquisition computer 18 for transmission down the cable 14 to the tools 16 and demodulates uplink data from the tools 16 for processing and storage by the acquisition computer 18.

The downhole telemetry cartridge 10 contains circuitry to modulate uplink data from the tools 16 for transmission up the cable 14 to the data acquisition computer and demodulate downlink commands from the acquisition computer for the tools. In digital telemetry systems, for example, such as the one provided by the invention, analog measurements collected by the tools 16 are converted into a digital form. That conversion may either be accomplished by the tools 16 themselves or by the telemetry cartridge 10. In a preferred embodiment of the present invention, the telemetry cartridge 10 transmits the digital data on a plurality of carriers on the wireline cable 14 to the uphole telemetry unit 12. The uphole telemetry unit 12, in turn, provides the digital data to the surface data acquisition computer 18. The uphole telemetry unit 12 and the downhole telemetry cartridge 10 cooperate in tuning the system to achieve a high data rate. This tuning of the system is performed at start-up, may be performed dynamically during the operation of the system, and is described in greater detail below in conjunction with FIG. 6.

In a preferred embodiment of the present invention, the uphole telemetry unit 12 modulates the collected data from the logging tools 16 using discrete multitone modulation (DMT). DMT is described in "Multicarrier Modulation for Data Transmission: An Idea Whose Time Has Come", John A. C. Bingham, IEEE Communications Magazine, May 1990, which is incorporated herein by reference. A DMT system provides for separate modulation of data onto a large number of carrier signals. In the preferred embodiment, 256 carrier signals are used. Each carrier is a 586 Hz wide frequency band. The bit-stream is divided into as many bit groups as there are carrier signals. Each bit group is modulated onto its associated carrier using Quadrature Amplitude Modulation (QAM). QAM is described in Tanenbaum, Andrew, *Computer Networks*, 2 ed., Prentice Hall, 1989, pp. 73-75, which is incorporated herein by reference. In the preferred embodiment, the telemetry system measures the signal-to-noise ratio on each carrier. That measurement is used to determine the number of bits for modulating each carrier. Similarly, the telemetry system of the present invention uses the signal-to-noise ratio on each carrier to adjust the amplitudes, on a carrier-by-carrier basis, to maximize overall data rate.

II. Downhole Telemetry Cartridge 10

II.a Overview

Figure 3:
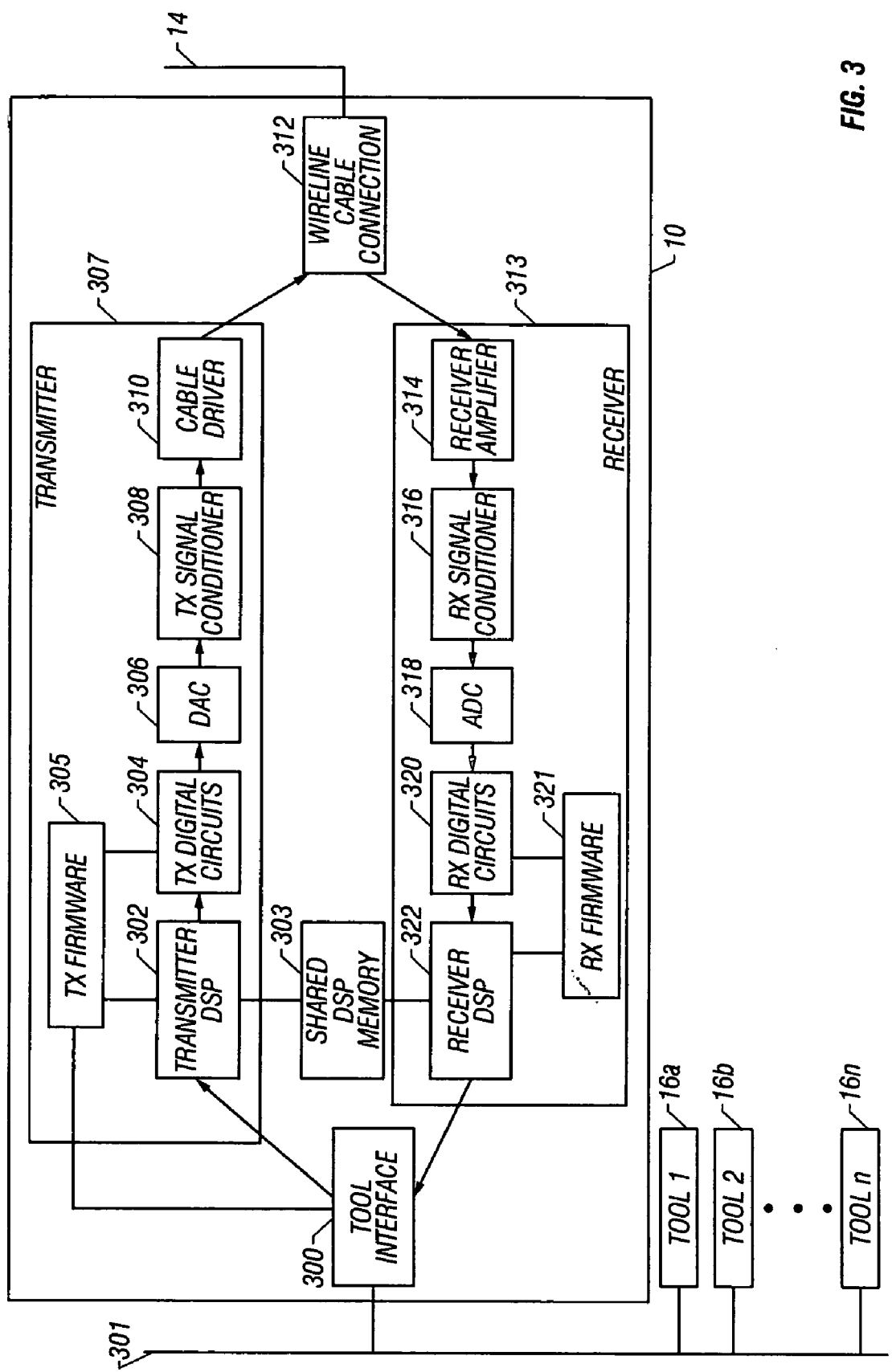
FIG. 3 is block diagram of a downhole telemetry cartridge used in a well-logging operation as shown in FIG. 1.

FIG. 3 is a schematic illustration providing further detail of the downhole telemetry cartridge 10 and its connections to the well-logging tools 16 and the wireline cable 14. The telemetry cartridge 10 is connected via a tool bus 301 to the tools 16. For illustrative purposes, in FIG. 3, three tools 16*a*, 16*b*, and 16*n* are connected to the tool bus 301. Many more tools 16 can be connected to the tool bus 301. Similarly, in some embodiments only one tool 16 would be connected to the tool bus 301. Alternatively, the tools 16 may be connected to the telemetry cartridge 10 using some other connection scheme, for example, by direct connection to the telemetry cartridge or by being daisy-chained.

In the example of FIG. 3, the telemetry cartridge 10 is shown as a separate unit from the tools 16. Alternatively, the telemetry cartridge 10 may be integrated into one of the tools 16.

II.b Downhole Uplink Path

The uplink path of the telemetry cartridge 10 consists of a tool interface 300 and a transmitter 307. The transmitter 307, in turn, consists of a transmitter digital signal processor (DSP) 302, transmitter digital circuits 304, a transmitter firmware 305, a digital to analog converter (DAC) 306, a transmitter signal conditioner 308, and a cable driver 310. The transmitter 307, specifically the cable driver 310, is connected to a wireline cable connection 312, thereby having a connection to the wireline cable 14.

The tool interface 300 provides a bi-directional link between other parts of the downhole telemetry circuits 10 and the tools 16. The connection to the tools may be a proprietary bus (e.g., Schlumberger's DTB and FTB) or a general purpose bus (e.g., the CAN bus). The tool interface 300 delivers uplink data to the telemetry circuits, and this data is processed and transmitted to the acquisition computer 18.

The transmitter DSP 302 is connected to the tool interface 300 and receives as input from the tool interface 300 digital sensor data, status, and other information. The transmitter DSP 302 executes instruction sequences (for example, embodied in software or the transmitter firmware 305) to format the digital data, to add additional status information, and to modulate the data onto a set of carrier frequencies. The output of the transmitter DSP 302 is fed into the transmitter digital circuits 304 and consists of digital data that represents periodic samples of the analog waveform to be transmitted via the wireline cable 14 to the acquisition computer 18. The instructions executed by the DSP 302 are discussed in greater detail in conjunction with FIG. 5.

The transmitter digital circuits 304 also execute instruction sequences from the firmware 305. The transmitter digital circuits 304 upsample and interpolate the digital output of the transmitter DSP 302 to provide the DAC 306 with digital samples at a rate that is faster and has better resolution than would otherwise be possible with the DSP 302 alone. The output of the transmitter digital circuits 304 is a series of digital samples that represent consecutive samples of the analog waveform to be transmitted.

In the preferred embodiment, the DSP 302 is connected to a shared DSP memory 303. The DSP 302 accesses the shared memory 303 to obtain parameters set using the downlink path (described below).

The DAC 306 converts the digital output of the transmitter digital circuits 304 into an analog waveform that will be transmitted via the wireline cable 14 to the acquisition computer 18.

The transmitter signal conditioner 308 amplifies and filters the analog output of the DAC 306. The output of the transmitter signal conditioner 308 is an analog voltage waveform with improved amplitude to match the dynamic range of the cable driver 310 and improved spectral characteristics to reduce out-of-band energy.

The cable driver 310 applies the amplified, filtered output of the transmitter signal conditioner 308 to the wireline cable 14 via the wireline cable connections 312. The output of the cable driver is an analog voltage waveform with improved power drive capability.

The wireline cable connections 312 provide impedance matching and electrical connection with the conductors of the wireline cable 14. The output of the cable driver 310 is applied to the wireline cable 14 through the wireline cable connections 312, and the input of the receiver 313 is also connected to the wireline cable through these connections. Cables with multiple conductors naturally support a variety of cable connection schemes.

II.c Downhole Downlink Path

The telemetry cartridge 10 also receives commands from the acquisition computer 18 via the receiver DSP 322 and transmits these commands to the tools via the tool interface 300.

The downlink path of the telemetry cartridge 10 consists of the wireline cable connection 312 and a receiver 313 connected to the tool interface 300. The receiver contains a receiver amplifier 314, a receiver signal conditioner 316, an analog to digital converter (ADC) 318, a receiver digital circuit 320, a receiver digital signal processor (DSP) 322, and receiver firmware 321 and is connected to the tool interface 300.

The receiver amplifier 314 receives downlink signals sent from the acquisition computer 18. The downlink signals are received through the wireline cable connections 312. The output of the receiver amplifier 314 is an analog voltage waveform that represents the voltage waveform on the wireline cable 14. The receiver signal conditioner 316 applies gain and filtering to the received signal to match the amplitude and spectral content of the waveform to the other telemetry circuits and to improve the processing results.

The analog-to-digital converter (ADC) 318 converts the analog voltage waveform from the receiver signal conditioner 316 to digital samples that may be processed using digital computers such as the receiver digital circuits 320 and the receiver DSP 322.

Figure 9:
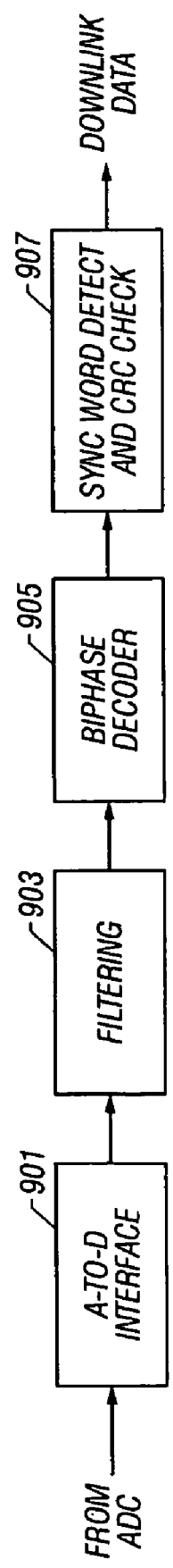
FIG. 9 is a block diagram of the firmware controlling operation of the downhole telemetry unit for processing downlink data.

The receiver digital circuits 320 buffer the digital samples from the ADC 318 and provide them to the receiver DSP 322 for processing. The receiver DSP 322 processes the digital samples from the receiver digital circuits 320 and demodulates the sequence of samples to obtain the downlink command sent by the acquisition computer 18. Baseband, bandpass, or multitone modulation may be used. The operation of the receiver digital circuits 320 and the receiver DSP 322 are discussed in greater detail below in conjunction with FIG. 9.

The receiver DSP 322 is also connected to the shared DSP memory 303. As mentioned above and described in greater detail below in conjunction with FIG. 6, the uphole telemetry unit 12 and the downhole telemetry cartridge 10 cooperate on the tuning of certain parameters, for example, the number of bits per carrier and the power applied to each carrier. These parameters are stored in the shared DSP memory 303 by the receiver DSP 322 and accessed by the transmitter DSP 302.

III. Uphole Telemetry Unit 12

III.a Uphole Downlink Path

Figure 4:
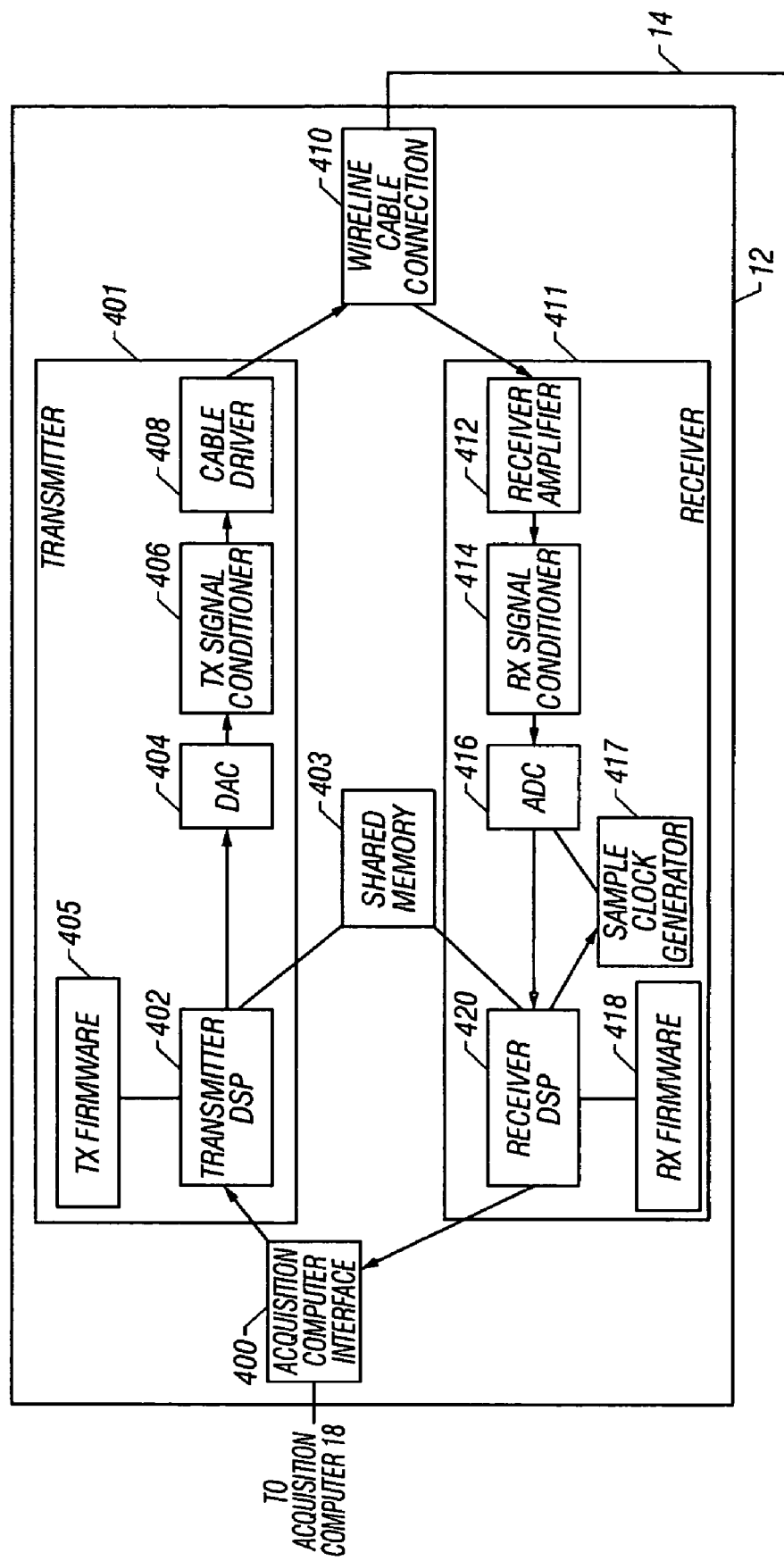
FIG. 4 is a block diagram of the surface telemetry unit used in a well-logging operation as shown in FIG. 1.

FIG. 4 is a schematic diagram of the of the uphole telemetry unit 12. The downlink path of the uphole telemetry unit 12 consists of an acquisition computer interface 400 and a transmitter 401. The transmitter 401 consists of a transmitter DSP 402, a digital to analog converter 404, a transmitter signal conditioner 406, and a cable driver 408. The transmitter 401, specifically the cable driver 408, is connected to a wireline cable connection 410.

The acquisition computer interface 400 provides a bi-directional link between the uphole telemetry circuits and the other components of the acquisition computer 18. The interface to the acquisition computer 18 may be a proprietary bus or a general purpose bus (e.g., VME, ethernet). The acquisition computer interface 400 delivers downlink commands to the telemetry circuits, and this data is transmitted via the wireline cable 14 to the well-logging tools 16. The acquisition computer interface 400 is, for example, a programmable logic device or an application specific integrated circuit (ASIC).

Figure 5A:
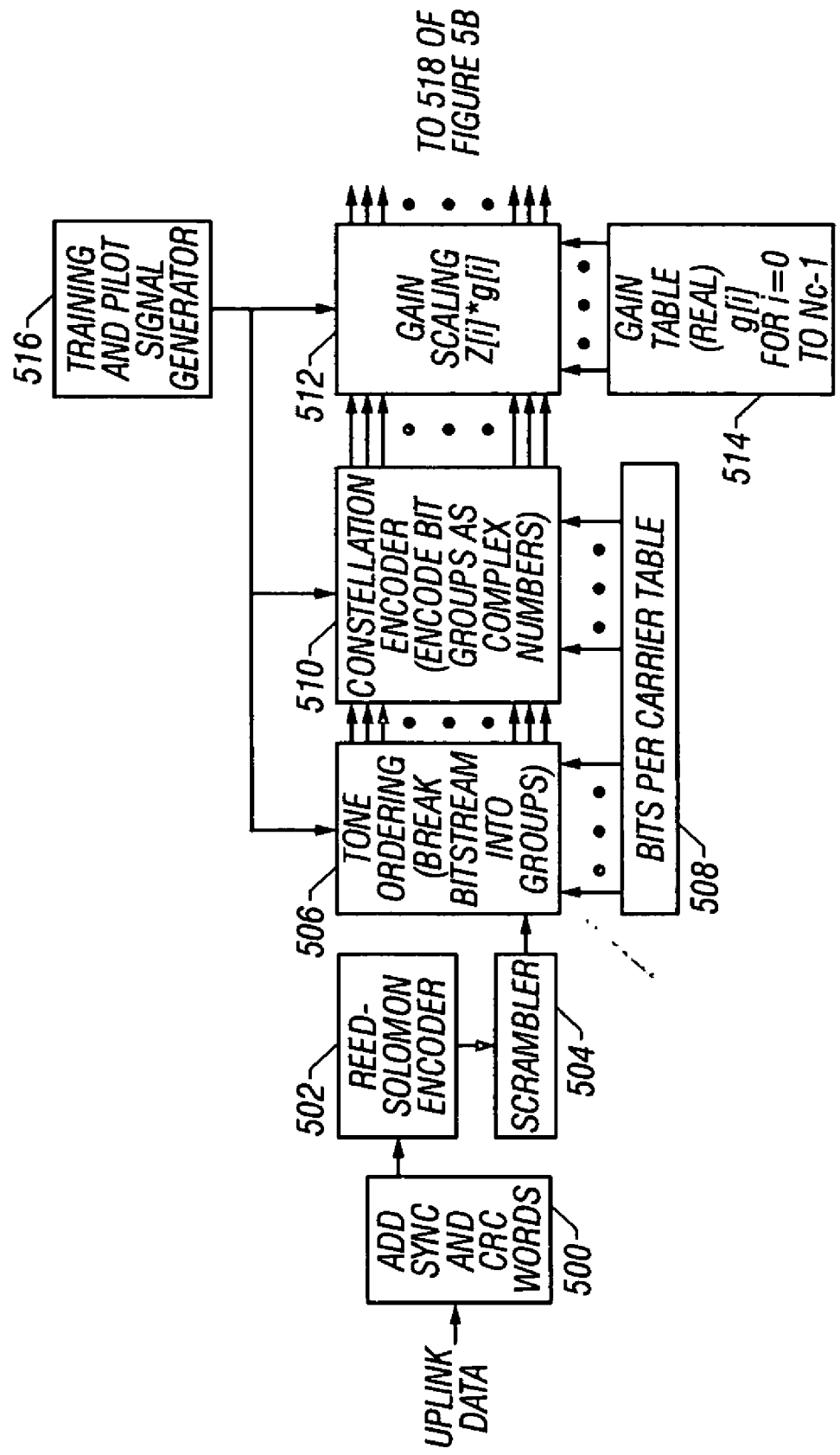
FIGS. 5A, 5B, and 5C are block diagrams of the architecture of the transmitter firmware controlling the downhole telemetry cartridge of FIG. 3.
Figure 5B:
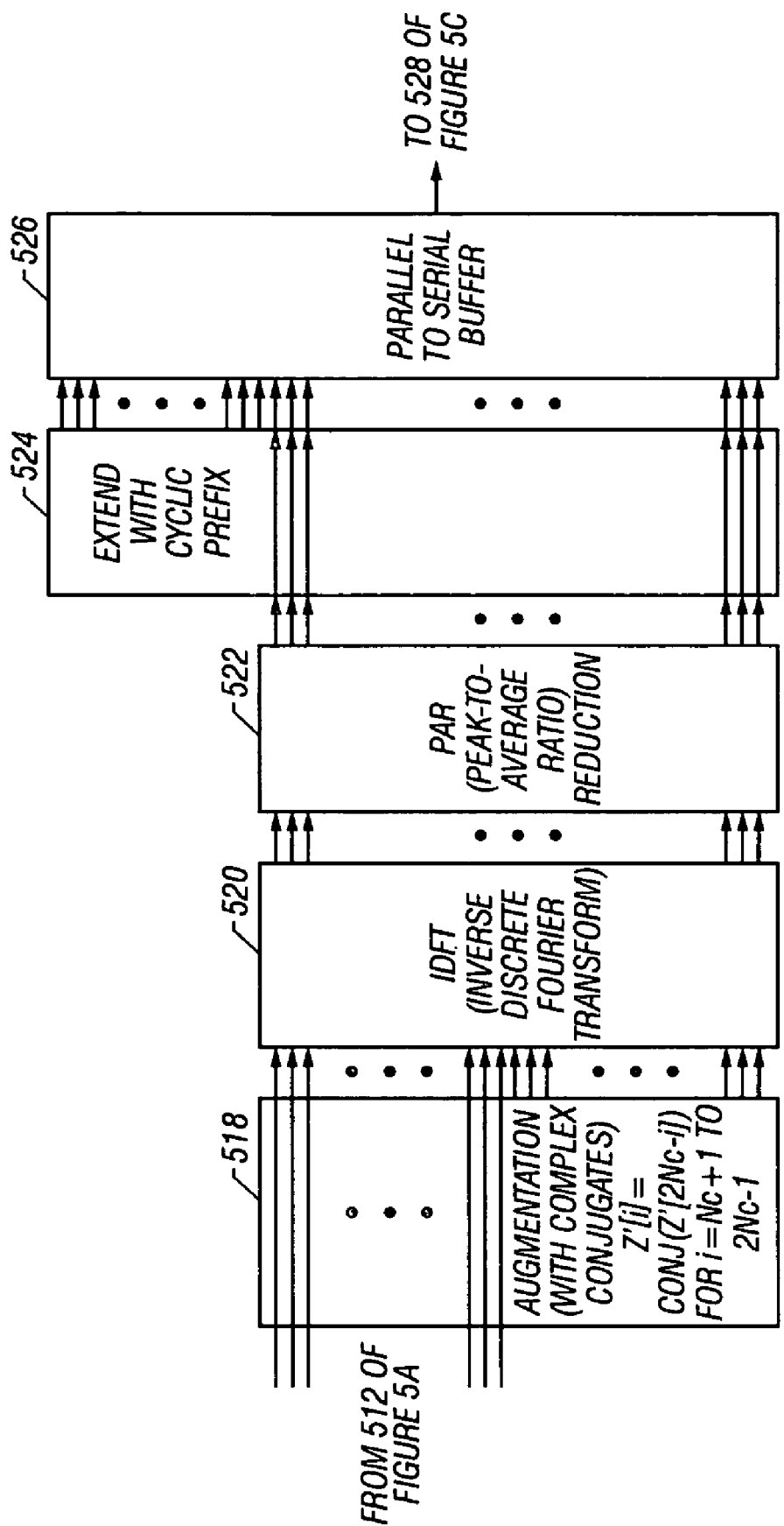
Figure 5C:
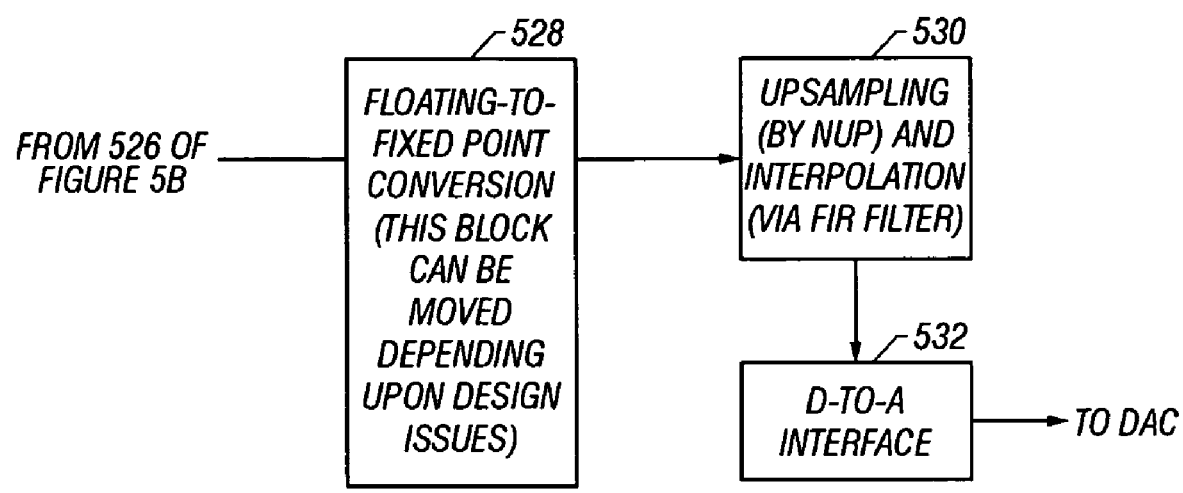
Figure 6:
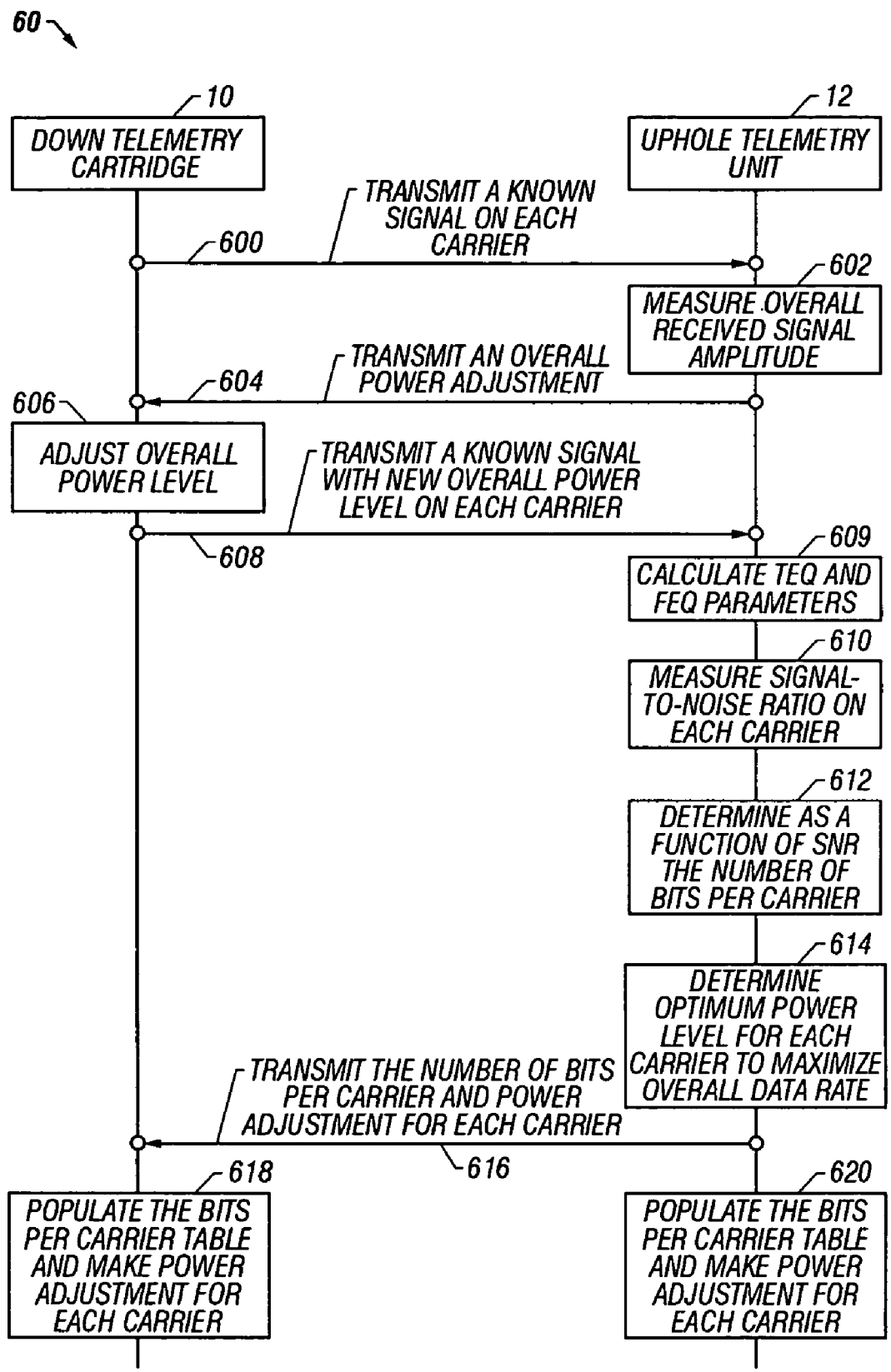
FIG. 6 is a block diagram of the start-up procedure used to optimize the utilization of the wireline cable.
Figure 7A:
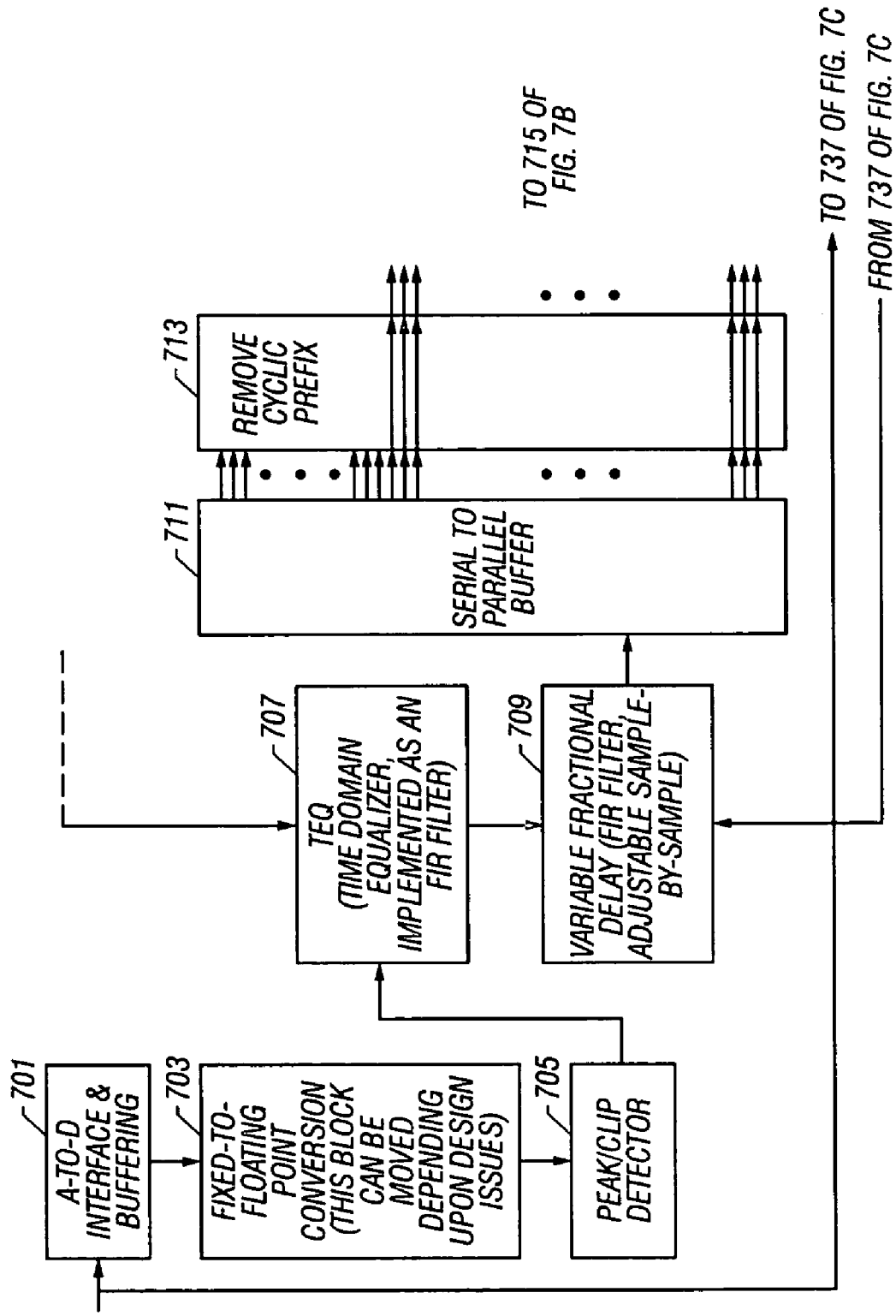
FIGS. 7A, 7B, and 7C are block diagrams of the architecture of the receiver firmware controlling the surface telemetry unit of FIG. 4.
Figure 7B:
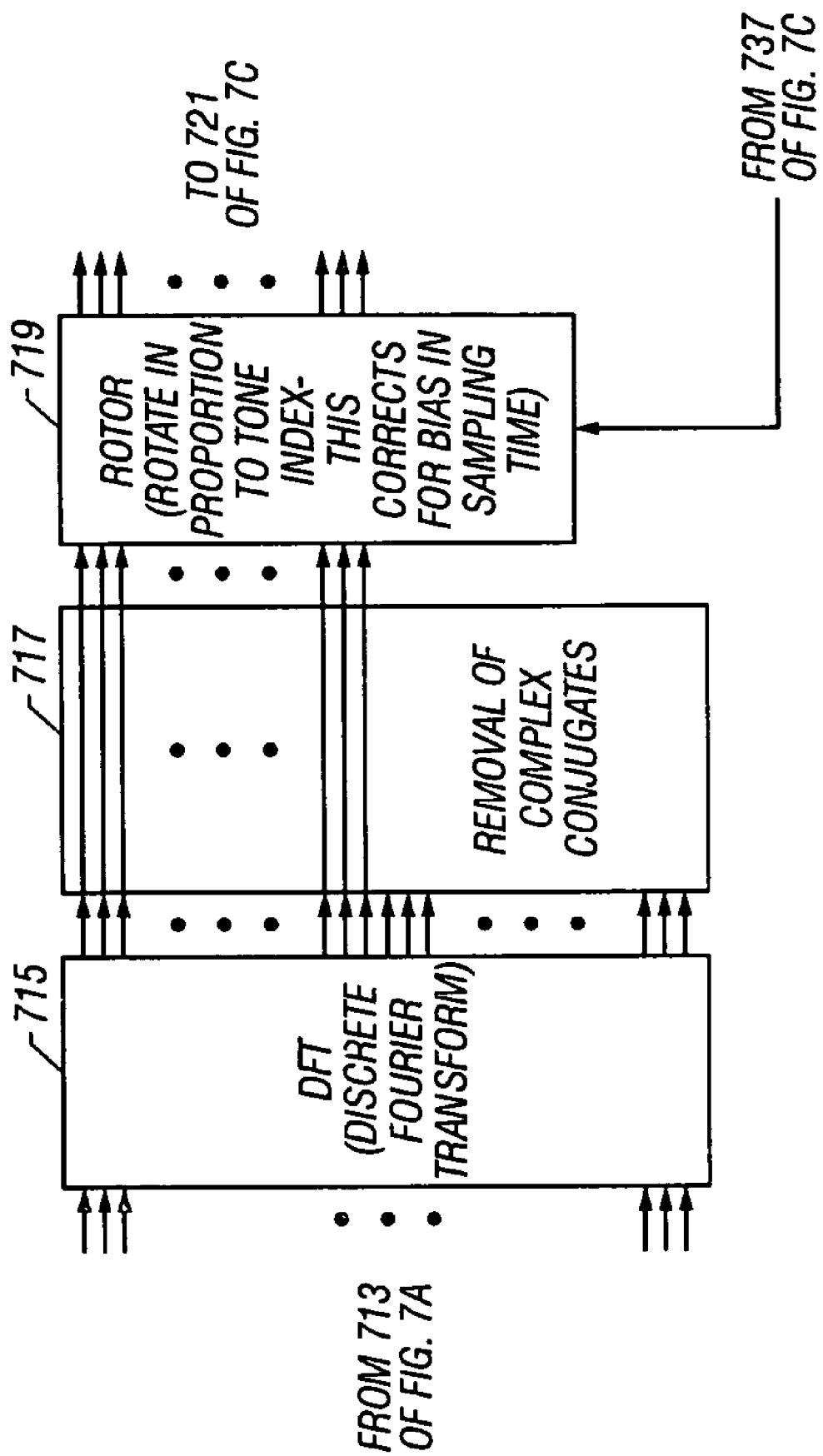
Figure 7C:
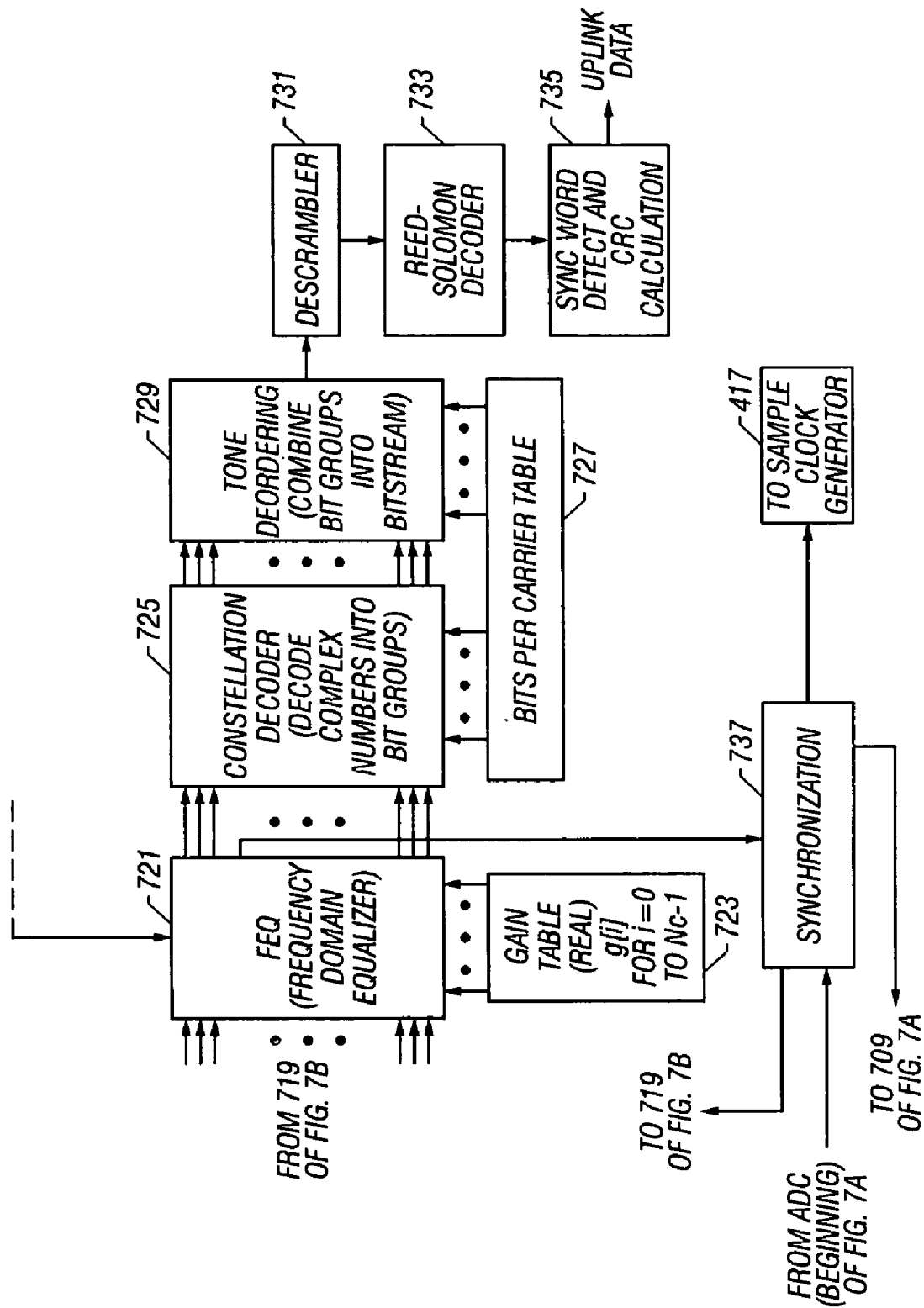

The transmitter DSP 402 receives as input digital commands, status, and other information from the acquisition computer interface 400. The operation of the transmitter DSP 402 is controlled by either software instructions or, as is illustrated, firmware instructions 405. The transmitter DSP 402 executes instructions that cause it to format the digital data, add additional status information, and modulate the data. Baseband, bandpass, or multitone modulation may be used. The output from the transmitter DSP 402 is digital data that represents consecutive samples of the analog waveform to be transmitted via the wireline cable 14 to the well-logging tools 16. During a training sequence, which is discussed below, the transmitter sends parameters used in the modulation and demodulation of uplink data to the downhole telemetry cartridge 10. These parameters, discussed in greater detail below in conjunction with FIGS. 5, 6, and 7, are stored in a shared memory 403.

The DAC 404 converts the digital output of the transmitter DSP 402 into an analog waveform that will be transmitted via the wireline cable 14 to the well-logging tools 16.

The transmitter signal conditioner 406 amplifies and filters the analog output of the DAC 404. The output of the transmitter signal conditioner 406 is an analog voltage waveform with improved amplitude to match the dynamic range of the cable driver 408 and improved spectral characteristics to reduce out-of-band energy.

The cable driver 408 applies the amplified, filtered output of the transmitter signal conditioner 406 to the wireline cable 14 via the wireline cable connections 410. The output of the cable driver 408 is an analog voltage waveform with improved power drive capability. In the preferred embodiment, the cable driver 408 operates from voltage supplies of a range of at least −15 to 15 volts. Furthermore, the cable driver 408 operates to drive the output waveform at an optimal power level for the cable 14. The optimal power level is affected by cable length and properties such as cable material, cable temperature, and cable geometry. In modern petroleum exploration and production it is not uncommon to have boreholes with a length exceeding 30,000 feet, thus, requiring wireline cables exceeding 30,000 feet. For such long cables, the cable driver 408 is operable to drive the output to an overall power level exceeding 1 Watt.

High power levels are possible in the wireline environment because in that environment it is not necessary to avoid crosstalk with near-lying signals. Therefore, the output power from the cable driver 408 is only limited by the input tolerance of the receiver 411.

The wireline cable connections 410 provide impedance matching and electrical connection with the conductors of the wireline cable 14. The output of the cable driver 408 is applied to the wireline cable 14 through these connections 410. The wireline cable connections 410 further provide the connections required to make possible the use of multiple propagation modes (as described above with reference to FIG. 2).

III.b Uphole Uplink Path

The uplink path of the uphole telemetry circuits consists of, again, the wireline cable connection 410 and a receiver 411. The receiver 411 consists of a receiver amplifier 412, a receiver signal conditioner 414, an analog to digital converter 416, a receiver DSP 420, and a receiver firmware 418, and is connected to the acquisition computer interface 400.

The receiver amplifier 412 receives data sent from the tools 16 via the downhole telemetry unit 12 and wireline cable 14. The data is received through the wireline cable connections 410. Cables with multiple conductors naturally support a variety of cable connection schemes. The output of the receiver amplifier 412 is an analog voltage waveform that represents the voltage wavefrom on the wireline cable 14. The receiver signal conditioner 414 applies gain and filtering to the received signal to match the amplitude and spectral content to the other telemetry circuits and to improve the processing results.

The ADC 416 converts the analog voltage waveform from the receiver signal conditioner 414 to digital samples that may be processed by digital computers such as the receiver DSP 420. The ADC 416 samples the waveform at the same frequency as that produced by the downhole DSP 302. For example, if the DSP 302 produces samples at a rate of 300 kHz, the ADC 416 samples the waveform at 300 kHz. In alternative embodiments, the DSP 302 produces samples at other sampling rates.

The receiver DSP 420 processes the digital samples from the ADC 416 and demodulates the sequence of samples to obtain the uplink data sent by the tools 16. The receiver DSP 420 communicates this uplink data to the acquisition computer 18 via the acquisition computer interface 400. The operation of receiver DSP 420 is controlled by instruction sequences stored, for example, in receiver firmware 418. The parameters used by the receiver DSP 420 to demodulate the uplink data are stored in the shared memory 403. The correct sampling rate and phase of the ADC 416 is maintained by the sample clock generator 417, which is controlled by the synchronization block 737.

IV. Downhole Transmitter Firmware 305

IV.a Overview

FIG. 5 is a dataflow diagram of the downhole transmitter firmware 305 that controls the operation of the DSP 302 and the transmitter digital circuits 304. The firmware 305 may be stored, for example, in a ROM, or an EPROM. Alternatively, the functionality provided by the DSP 302, the transmitter digital circuits 304, and the firmware 305 may be implemented as an application specific integrated circuit (ASIC) or on a programmable logic array (PLA). In an alternative embodiment, the firmware 305 is replaced with software loaded into a random access memory (RAM) from a permanent storage device, EPROM or an EEPROM. That RAM may be integrated into the DSP 302.

The downhole firmware 305 contains instructions for converting binary data packets from logging tools into an analog signal that can be efficiently amplified and transmitted to the surface data acquisition computer 18 over a logging cable 14.

IV.b Tool Interface Firmware

In a first block, the tool interface 300 adds protocol layers to the data, including SYNC and CRC words, block 500. The tool interface block 500 prepends a synchronization word and appends a cyclic redundancy check (CRC) word to each uplink data packet. The synchronization word is a known 16-bit pattern of data, for example 0100101101100111, that allows the uphole telemetry unit 12 to detect where an uplink packet of data begins. The CRC word is a 16-bit word that is calculated as a function of all of the data within the packet. It is used at the receiver 411 to determine whether there are any errors in the transmission of the packet.

The uplink data packet is optionally passed through a Reed-Solomon encoder 502 block that computes several additional words as a function of the data packet. These words are appended to the data packet, and can be used in the receiver to perform error detection and error correction.

The uplink data is also passed through a scrambler block 504 that scrambles the data using a shift register with exclusive-or feedback. The purpose of the scrambler is to reduce the occurrence of periodic data patterns, which tend to cause problems with adaptive equalizers in the receiver of the uphole telemetry unit 12. Since the receiver is aware of the algorithm being used to scramble the data, it can correctly descramble the data so as to obtain the original data.

In the preferred embodiment, the Add-SYNC-and-CRC-words block 500, the Reed-Solomon encoder 502, and the scrambler 504 are all executed by the tool interface 300.

IV.c Tone Ordering

The output of the scrambler 504 is fed into a tone ordering block 506 which breaks the bitstream input from the tools 16 into groups, in accordance with a bits per carrier table 508. The bits per carrier table 508 is indexed by carrier number. The bits per carrier table 508 contains the number of bits to be used on each carrier of the DMT signal. For example, suppose that the bits per carrier table specifies 0 bits on carrier 0, 5 bits on carrier 1, 9 bits on carrier 2, and 10 bits on carrier 3. Since there are 0 bits allocated to carrier 0, the tone ordering block 506 would take the first 5 bits of incoming data and place them on the carrier 1 output. It would take the next 9 bits of incoming data and place them on the carrier 2 output, then take the next 10 bits and place them on the carrier 3 output, and so on. The bits per carrier table 508 is set up when the telemetry system is started. The start up sequence for populating the bits per carrier table 508 is described below in conjunction with FIG. 6.

IV.d Constellation Encoder

The grouped bits at the output of the tone ordering block are fed into a constellation encoder 510. The constellation encoder encodes the bit group corresponding to each carrier into a complex number (for example, 5+3j) using a one-to-one mapping as determined from the number of bits for the carrier as indicated in the bits per carrier table 508. This one-to-one mapping process allows the receiver DSP 420 to convert received complex numbers back into the original grouped bits of data. The output of the constellation encoder consists of Nc complex numbers, where Nc is the number of carriers used (in the preferred embodiment the number of carriers used is 256).

IV.e Gain Scaling

The Nc complex numbers at the output of the constellation encoder 510 are fed into a gain scaling block 512 for adjusting the power level of each carrier to the optimum power level as determined by the procedure of FIG. 6. The gain scaling block 512 contains instructions that cause the DSP 302 to multiply each complex number by a real number from the gain table 514.

IVA.f Start-Up Training Sequence

A training and pilot signal generator block 516 also feeds into the tone ordering block 506, the constellation encoder 510, and the gain scaling block 512. When the telemetry system is starting up, before there is any uplink data to be sent, the training and pilot signal generator block 516 produces appropriate sequences of complex numbers so as to generate training signals that allow the receiver to synchronize and start up properly.

FIG. 6 is a data flow diagram illustrating the start up sequence by which the bits per carrier table 508 and the gain table 514 are populated. The bits per carrier table 508 is initialized to a default configuration, in the preferred embodiment, two bits for each carrier.

The electronic circuits of the receiver 411 are designed to handle signal amplitudes within a specified range, e.g., between −5 and 5 volts. Because the signal-to-noise ratio improves at higher power levels, it is desirable to drive the signal at as high a power level as possible without exceeding the receiver's range. In a multi-carrier system, the signal-to-noise ratio is likely to vary from carrier to carrier. In the preferred embodiment of the present invention, the amplitudes for the carriers are set independently from one another. However, the amplitudes are initialized to a uniform value for each carrier.

The downhole telemetry cartridge 10 transmits a known signal to the uphole telemetry unit 12, step 600. In the preferred embodiment, the training and pilot signal generator block 516 initiates this transmission step 600. The known signal may be either a specific pattern or a pseudo random number. The known signal may be fed into either the tone ordering block 506, the constellation encoder 510, or the gain scaling block 512. The amplitude on each carrier is specified for the known signal by virtue of the gain table being initialized to a known (in the preferred embodiment, uniform) value for each carrier.

Due to attenuation, the signal amplitude will decrease as it is propagated on the wireline cable 14. The uphole telemetry unit 12 measures the received signal amplitude, step 602. Based on the received signal amplitude, the uphole telemetry unit determines an adjustment in the overall power level and transmits that adjustment back to the downhole telemetry cartridge 10, step 604. The downhole telemetry cartridge 10 adjusts the power level, step 606, and transmits a known signal at the adjusted power level on each carrier back to the uphole telemetry unit 12, step 608. The known signal may include a known complex number on each tone. In step 609, the uphole telemetry unit 12 calculates TEQ and FEQ parameters by dividing the transmitted known complex number by the received complex number.

The uphole telemetry unit 12 then measures the signal-to-noise ratio on each carrier, step 610. As a function of the signal-to-noise ratio (SNR), the uphole telemetry unit 12 determines the number of bits that should be used for each carrier, step 612. The optimal bits-per-carrier for a given signal-to-noise ratio may for example be stored in a look-up table. The uphole telemetry unit further determines the optimum power level for each carrier to maximize the overall data rate, step 614. The uphole telemetry unit upon detecting that a given used power level for a carrier does not increase the number of bits-per-carrier for that carrier, may lower the power level to the power level corresponding to the next entry in the SNR-to-bits-per-carrier look-up table. Conversely, if the SNR for a carrier falls close to the next increment of bits-per-carrier, the power may be adjusted upward to take advantage of the improved throughput achieved at that higher power level. The uphole telemetry unit 12 transmits the number of bits per carrier and the power adjustment for each carrier to the downhole telemetry cartridge 10, step 616. The downhole telemetry cartridge 10 stores the bits per carrier into the bit-per-carrier table 508 and the gain table 514, step 618.

There are changes to the environment that occur during a logging job. For example, the temperatures that the wireline cable 14 is exposed to changes as the tools 16 are raised and the electrical characteristics of the cable may also change as it is being coiled up on a reel. The noise spectrum may also change over time. For these reasons, there may be changes in the optimal number of bits per carrier and the optimal power levels for each carrier. Therefore, the start up procedure of FIG. 6 may be re-executed during the progress of a logging job. This re-execution could either be periodic or as triggered by specific events, for example, the deterioration of the overall signal-to-noise ratio or effective data rate. In the preferred embodiment only a portion of the start up procedure is executed during the progress of a logging job. The preferred method is to simply change the constellation or power level on specific carriers while the system continues running. One embodiment uses the method of adjusting gains and bit allocations from the Asymmetric Digital Subscriber Line ("ADSL") protocol known as "bit swapping." Bit swapping does not require the training procedure. The ADSL technique sends commands and acknowledgments to change the gains or bit allocations for a limited number of carriers. A synchronization mechanism is used to determine when to make the new settings effective. A limited amount of data may be lost or require retransmission.

IV.g Augmentation with Complex Conjugates

The output of the gain scaling block is fed into an augmentation block 518, which provides instructions to the DSP 302 to augment the Nc complex numbers from the gain scaling block 512 with their Nc complex conjugates, producing a total of 2Nc complex numbers at its output. An inverse discrete Fourier transform (IDFT) block 520 follows the augmentation block 518. The augmentation block 518 is executed so that the IDFT block 520 that follows will produce only real numbers. It is a mathematical property of the IDFT that input with complex numbers and their conjugates produces output consisting purely of real numbers.

IV.h Inverse Discrete Fourier Transform

The effect of the IDFT 520 is to convert each complex number into a sinusoidal carrier signal whose amplitude and phase are linearly dependent on the amplitude and phase of the complex number, and then sum the resulting sinusoidal signals together.

In one embodiment of the invention, the output of the IDFT block 520 is fed into a peak-to-average ratio reduction block 522. Because the peak-to-average ratio of a DMT signal can be relatively high, it is advantageous to reduce it if at all possible. Peak-to-average ratio reduction can be a very computationally intensive operation putting a substantial load on the DSP 302. Therefore, in embodiments of the invention where DSP compute power is limited, the peak-to-average ratio block 522 may be eliminated.

IV.i Extend-with-Cyclic-Prefix

The next step in processing is to pass the data through an extend-with-cyclic-prefix block 524. The cyclic prefix is generated by taking the last Ncyc (in the preferred embodiments, Ncyc is either 16 or 32) outputs of the IDFT 520 and prepending them to the IDFT output. The cyclic prefix allows the receiver 411 to more easily eliminate inter-symbol interference by providing additional transition time between one DMT symbol and the next DMT symbol.

IV.j Parallel-to-Serial

The output (with cyclic prefix) from the extend-with-cyclic-prefix block 524 is forwarded to a parallel-to-serial buffer 526. The parallel-to-serial buffer 526 sends the values one-at-a-time to the next stage of processing, a floating-to-fixed point conversion block 528. The output from the IDFT 520 is a 2Nc long array. Each array element corresponds to one discrete point on the waveform to be transmitted on the wireline cable 14. To enable the DAC 306 to convert the numeric values output from the IDFT 520 to analog voltage equivalents the array output from the IDFT 520 is serialized.

IV.k Floating-to-Fixed-Point Conversion

In the preferred embodiment, the IDFT 520 output values are floating point real numbers and the DAC 306 requires fixed-point values. The floating-to-fixed point block 528 converts each value from floating point (its representation inside the digital signal processor) to fixed point (the representation required for interfacing to a digital-to-analog converter).

In an alternative embodiment the DSP is programmed so as to produce output values that can be processed by the DAC without conversion, i.e., the DSP produces fixed point and the DAC accepts fixed point input or the DSP produces floating point and the DAC accepts floating point input.

IV.l Upsampling

The fixed point values are generated at a constant rate. In the preferred embodiment, this rate is between 300,000 and 500,000 values per second, and is selected to match the maximum sampling rate of the analog-to-digital converter in the uphole receiver 411. These samples are fed into an upsampling-and-interpolation block 530, which fills in the 300 kHz samples with additional interpolated samples so as to generate a smoother waveform. The preferred embodiment DMT well-logging telemetry system uses a 4× upsampler, so the output sample rate of the upsampler and interpolator 530 is 1.2 MHz when the sample rate is 300 kHz.

The output of the upsampler and interpolator 530 is clocked into the digital-to-analog converter (DAC) 306 via a DAC interface 532, at a precise and fixed rate. In the preferred embodiment, the upsampler and interpolator blocks 530 are executed by the transmitter digital circuits 304.

As discussed above in conjunction with FIG. 3, the DAC 306 converts the upsampled output from the DSP 302 to an analog output signal, the transmit signal conditioner 308 amplifies and filters the signal, and cable driver 310 operates to place the signal onto the wireline 14 via the wireline cable connections 312.

V. Uphole Receiver Firmware 418

V.a Overview

FIG. 7 is a dataflow diagram of the uphole receiver firmware 418 which controls the operation of the receiver DSP 420, and the acquisition computer interface 400. The firmware 418 may be stored, for example, in a ROM, or an EPROM. Alternatively, the functionality provided by the DSP 420 and the firmware 418 may be implemented as an application specific integrated circuit (ASIC) or on a programmable logic array (PLA). In an alternative embodiment, the firmware 418 is replaced with software loaded into a random access memory (RAM) from a permanent storage device, EPROM or an EEPROM. That RAM may be integrated into the DSP 418.

The uphole firmware 418 is responsible for receiving the analog signal from the logging cable and processing it appropriately so as to recover the binary data transmitted from the downhole telemetry cartridge 10. For reasons of efficiency, several of the blocks in FIG. 7 may be combined within the firmware 418.

V.b Analog-to-Digital Interface and Fixed-to-Floating Point Conversion

An Analog-to-Digital Interface block 701 receives as input the digital samples sent from the analog-to-digital converter 416 to the DSP 420. In the preferred embodiment, the digital samples are in a fixed point format. The fixed point formatted values are converted to floating point values by a fixed-to-floating point conversion block 703, so that subsequent calculations do not have to deal with the possibility of fixed point overflow. In an alternative embodiment, the samples are received in a floating point format and no further conversion is required.

V.c Peak/Clip Detector

The floating point samples are passed through a peak/clip detector block 705 which allows the uphole telemetry unit 10 to determine whether the incoming signal is exceeding the dynamic range for the input, so that appropriate action can be taken, e.g., reducing the transmitter power level in the downhole telemetry cartridge 10. The feedback to the to downhole telemetry cartridge 10 is carried out using the downlink path and is transmitted from the receiver DSP 420 to the transmitter DSP 402 via a shared memory 403. In an alternative embodiment, the receiver DSP 420 may communicate directly with the transmitter DSP 401, or the functionality of DSP 420 and DSP 402 may be combined in a single physical DSP. The peak/clip detector block 705 also determines if the receiver gain should be adjusted to achieve better signal-to-noise ratio.

V.d Time-Domain Equalizer

The floating point samples are input into a time-domain equalizer (TEQ) block 707 that is implemented in the preferred embodiment as a finite impulse response (FIR) digital filter. The coefficients of the filter are chosen during telemetry start-up so as to reduce the net impulse response of the system that remains after the cyclic prefix. Under ideal conditions, the length of the net impulse response of the system is less than the length of the cyclic prefix, and intersymbol interference is completely eliminated.

V.e Variable Fractional Delay

The output of the TEQ 707 is fed into an optional variable fractional delay block 709. The variable fractional delay interpolates between samples so as to allow finer timing and synchronization control.

V.f Serial-to-Parallel Buffer

The samples from the TEQ 707 (directly or via the optional variable fractional delay block 709) are fed into a serial-to-parallel buffer block 711. The serial-to-parallel buffer block 711 accepts a serial data stream and produces an output that is Ncyc+2Nc samples long, where Ncyc is the size of the cyclic prefix added in block 524 and Nc is the number of carrier frequencies. The number is Ncyc+2Nc long because of the cyclic prefix (Ncyc) added by the extend-with-cyclic-prefix block 524 and because of the augmentation with conjugates from block 518 (2Nc).

V.g Remove-Cyclic-Prefix

The parallel outputs from the serial-to-parallel buffer 711 are fed into a remove-cyclic-prefix block 713, which removes the first Ncyc samples (the cyclic prefix). Because the cyclic prefix contains a mixture of information from both the current and the previous DMT symbol, it cannot be used for additional processing and is therefore ignored.

V.h Discrete Fourier Transform and Removal of Complex Conjugates

The 2Nc samples from the cyclic prefix remover 713 are fed into a Discrete Fourier Transform (DFT) block 715. For each of the discrete carriers, the DFT produces a complex number that represents the received amplitude and phase of that carrier. It is a mathematical property of the DET that a 2Nc sample real input will produce Nc complex values as well as Nc redundant complex conjugates, so the redundant complex conjugates are stripped off by a removal of complex conjugates block 717.

V.i Rotor

In some embodiments of the invention, the Nc complex values from the removal of complex conjugates block 717 are fed into an optional rotor block 719. The rotor block has the ability to rotate each complex number in proportion to its tone index, which allows it to correct for any bias in the analog-to-digital converter sampling time.

V.j Frequency Domain Equalizer

The output of the rotor 719 (if the rotor 719 is used, otherwise, the output from the removal of complex conjugates 717) is fed into a frequency-domain equalizer (FEQ) block 721. The FEQ block 721 multiplies each complex input by a complex value that compensates for the gain and phase response of the cable at that carrier frequency, as well as any gain scaling that was included at the transmitter by the gain scaling block 514. The complex values used by the FEQ block 721 are calculated during the start-up procedure as described above in conjunction with FIG. 6. During the start-up procedure shown in FIG. 6, the gain table 723 is populated with the same values as those in the gain table 514, and then the complex values used by the FEQ are updated by dividing each one by the associated gain table value. This allows the FEQ to compensate for the effect of the gain scaling as well as the effect of the cable.

V.k Constellation Decoder

The output of the FEQ is fed into a constellation decoder 725. The constellation decoder 725 maps the complex number received for each carrier and determines, based on the settings in a bits-per-carrier table 727, the corresponding group of data bits that map to that point. The bits-per-carrier table 727 is populated by the training procedure of FIG. 6.

V.l Tone Deordering

The individual bit groups from the constellation decoder 725 are combined back into a bitstream by a tone deordering block 729. The resulting bitstream is fed into a descrambler block 731, which reverses the scrambling operation that occurred at the downhole unit 10 in the scrambler 504. In the preferred embodiment, the descrambler block 731 is executed by the acquisition computer interface 400.

V.m Reed-Solomon Decoder, SYNC Detect, and CRC Calculation

If the transmitter implements Reed-Solomon encoding of the data, the descrambler output also is fed through a Reed-Solomon decoder 733. The Reed-Solomon decoder uses the mathematical properties of the Reed-Solomon code to detect and correct errors in the received data. The output of the Reed-Solomon decoder (if Reed-Solomon decoding is performed, otherwise, the output from the descrambler 731) is fed into a SYNC word detect and CRC calculation block 735. The SYNC word detect and CRC calculation block 735 detects the presence of a SYNC word to determine where each data packet begins, and then calculates the CRC value using the data and compares the calculated value to the received CRC value to determine if there are any remaining errors in the data. Erroneous data is discarded. The output of the SYNC word detect and CRC calculation block 735 is completely recovered uplink data which is transferred to the acquisition computer 18.

V.n. Synchronization

The synchronization block 737 is responsible for maintaining the correct sampling rate and phase of the analog-to-digital converter 416. The synchronization block 737 receives input either from the analog-to-digital converter 416 or the FEQ 721. Before the TEQ 707 and FEQ 721 have been trained, the synchronization block 737 ignores the FEQ signal and uses the signal from the analog-to-digital converter 416. The synchronization block 737 detects zero crossings in the analog-to-digital signal and adjusts the phase of the sample clock 417 whenever it detects that the zero crossings have drifted in time, thus maintaining the correct sampling rate and phase. After the TEQ 707 and FEQ 721 have been trained, the synchronization block 737 ignores the analog-to-digital converter signal and uses only the output of the FEQ 721. The synchronization block 737 detects rotation in the FEQ output. Whenever the amount of rotation exceeds a threshold, the synchronization block 737 adjusts the phase of the sample clock 417, thereby maintaining the correct sampling rate and phase.

VI. Downlink Data

Figure 8:
FIG. 8 is a block diagram of the firmware controlling operation of the downlink transmission from the uphole telemetry unit.

The uphole firmware is also responsible for converting downlink data into an analog signal that can be transmitted down the cable 14. FIG. 8 is an illustration of the firmware 405 that controls the operation of the uphole hardware when transmitting data in the downlink direction. The downlink data is transmitted on the same physical wires of the wireline cable 14 using a different propagation mode from that used by the uplink data. Alternatively, the downlink data and the uplink data are transmitted on different wires or the downlink and uplink data are transmitted full duplex on the same propagation mode. In the preferred embodiment, the downlink uses biphase modulation.

The three blocks that implement this functionality in the uphole firmware are a binary-to-biphase converter 801, waveform generator 803, and digital-to-analog interface block 805.

The downhole firmware 321 is responsible for controlling the operation of the downhole receiver digital circuits 320 and receiver DSP 322 for processing downlink data from the surface. In a preferred embodiment, the downlink communication system operates using biphase modulation. Biphase modulation in the context of oil well wireline communication is described in U.S. Pat. No. 4,868,569, the entire disclosure of which is incorporated herein by reference. The downhole unit 10 demodulates the downlink signal according to instructions received from an analog-to-digital interface block 901, a filtering block 903, a biphase decoder 905, and SYNC word detect and CRC check block 907. The operation of these blocks is described in U.S. Pat. No. 4,868,569.

VII. Methodology

A challenge in adopting DMT for well-logging wireline applications is the harsh environment under which the downhole telemetry cartridge 10 must operate. Well-logging operations may be carried out in boreholes that are more than 30,000 feet deep. Extremely high temperatures are encountered at such depths. In the preferred embodiment, the downhole cartridge electronics must operate at a temperature of up to 150 degrees Celsius. Conventional DMT equipment is not capable of operating at such high temperatures. A method of constructing a downhole cartridge according to the invention includes the step of obtaining circuits with performance specifications required, e.g., the DSP 302 and DSP 322 should be capable of executing the instructions provided by the firmware 305 and 321, respectively. Each such device is then placed in a high temperature test environment and tested to verify that the device meets performance requirements at the elevated temperature.

The foregoing describes preferred embodiments of the invention and is given by way of example only. The invention is not limited to any of the specific features described herein, but includes all variations thereof within the scope of the appended claims.

What is claimed is:

1. A telemetry system for transmitting well-logging data from at least one downhole tool to a surface data acquisition system, the at least one down hole tool having a first tool data input/output interface, the telemetry system comprising:

a. a downhole telemetry cartridge connected to the at least one downhole tool via a second tool data input/output interface connected to the first tool data input/output interface, wherein the downhole telemetry cartridge receives a bitstream from the at least one downhole tool over the second input/output interface and comprising:

a transmitter connected to the second tool data input/output interface, and having a logic operable to cause transmission of the bitstream as analog signals on a plurality of carrier frequencies to an uphole telemetry unit connected to the downhole telemetry cartridge by a wireline; and a cable driver having transmission power level control circuitry having logic to control the transmission power to optimize the total transmission power applied to the wireline cable in response to a received adjustment signal transmitted to the downhole telemetry cartridge from the uphole telemetry unit and wherein the adjustment signal is a function of cable length, cable material, cable temperature, and cable geometry;

b. wherein the uphole telemetry unit is further connected to the surface data acquisition system via an acquisition computer interface and comprising a receiver connected to the surface data acquisition system and having logic operable to receive the analog signals on the plurality of carrier frequencies, to demodulate the received signals into a bitstream, and to output the bitstream to the acquisition computer via the acquisition computer interface;

overall power setting logic to measure the received signal amplitude and, in response to the measure of the received signal amplitude, to transmit the adjustment signal to the downhole telemetry cartridge; and logic to cause the overall power setting logic to be executed prior to determining bits-per-carrier and power-level per carrier; and c. a wireline cable providing an electrical connection between the downhole telemetry cartridge and the uphole telemetry unit, wherein the analog signals are transmitted in an uphole direction on the wireline cable.

2. The telemetry system of claim 1, wherein the downhole telemetry cartridge is constructed from components capable of operation at temperatures above 150 degrees Celsius.

3. The telemetry system of claim 1 wherein the wireline cable is a heptacable.

4. The telemetry system of claim 1, wherein the transmission of the adjustment signal during the course of a logging job is performed in response to an observed condition.

5. The telemetry system of claim 4 wherein the observed condition is selected from the set including the elements deterioration of overall signal-to-noise ratio and deterioration of effective data rate.

6. A telemetry system for transmitting well-logging data from at least one downhole tool to a surface data acquisition system, the at least one down hole tool having a first tool data input/output interface, the telemetry system comprising:

a. a downhole telemetry cartridge connected to an uphole telemetry unit over a wireline cable that provides an electrical connection between the downhole telemetry cartridge and the uphole telemetry unit;

b. the downhole telemetry cartridge connected to the at least one downhole tool via a second tool data input/output interface connected to the first tool data input/output interface, wherein the downhole telemetry cartridge receives a bitstream from the at least one downhole tool over the second input/output interface and comprising:

a transmitter connected to the second tool data input/output interface, and having a logic operable to cause transmission of the bitstream as analog signals on a plurality of carrier frequencies and having logic to perform a training sequence including transmitting a known signal on the plurality of carriers, to receive a control signal, and in response to the control signal, to adjust at least one characteristic selected from the set having the members total power, power-per-carrier and bits-per-carrier; and c. the uphole telemetry unit connected to the surface data acquisition system via an acquisition computer interface and comprising a receiver connected to the surface data acquisition system and having logic operable to receive the analog signals on the plurality of carrier frequencies, to demodulate the received signals into a bitstream, and to output the bitstream to the acquisition computer via the acquisition computer interface; and an uphole transmitter operable to perform a training sequence including to receive the known signal, and in response to receiving the known signal, determining an adjustment selected from the set having the members total power, power-per-carrier and bits-per-carrier, and to transmit control signals from the data acquisition system to the at least one downhole tool, wherein the control signals are transmitted simultaneously on the wireline cable in a second propagation mode that is different from the first propagation mode and at least one of the first and second propagation modes further comprises a pilot tone;

wherein the performance of the training sequence is performed repeatedly during the course of a logging job.

7. The telemetry system of claim 6, wherein the downhole telemetry cartridge is integrated into one of the at least one downhole tool.

8. The telemetry system of claim 6, wherein the downhole telemetry cartridge further comprises a sample clock operating at a sampling rate within the range of 300 kHz to 500 kHz.

9. The telemetry system of claim 6, wherein the downhole telemetry cartridge further comprises:

a cable driver having power optimization logic to adjust total output power of the analog signal to a power level optimized for the wireline cable.

10. The telemetry system of claim 9, wherein the cable driver operates from a voltage supply of a range of at least −15 volts and 15 volts.

11. The telemetry system of claim 9, wherein the cable driver operates to drive the total output power to the maximum input tolerance power level of the receiver.

12. The telemetry system of claim 11, wherein the cable driver operates to drive the total output power without consideration for cross-talk with other signals.

13. The telemetry system of claim 6 wherein the training sequence is performed periodically.

14. The telemetry system of claim 6 the training sequence is performed in response to an observed condition.

15. The telemetry system of claim 14 wherein the observed condition is selected from the set including the elements deterioration of overall signal-to-noise ratio and deterioration of effective data rate.

16. A telemetry system for transmitting well-logging data from at least one downhole tool to a surface data acquisition system, the at least one down hole tool having a first tool data input/output interface, the telemetry system comprising:

a. a downhole telemetry cartridge connected to the at least one downhole tool via a second tool data input/output interface connected to the first tool data input/output interface, wherein the downhole telemetry cartridge receives a bitstream from the at least one downhole tool over the second input/output interface and comprising:

a transmitter connected to the second tool data input/output interface, and having a logic operable to cause transmission of the bitstream as analog signals on a plurality of carrier frequencies; and a cable driver having transmission power control circuitry having logic to independently control the transmission power of each carrier frequency; and a logic to perform a training sequence including transmitting a known signal on the plurality of carriers, to receive a control signal, and in response to the control signal, to adjust the power-per-carrier;

b. an uphole telemetry unit connected to the surface data acquisition system via an acquisition computer interface and comprising
      a receiver connected to the surface data acquisition system and having logic operable to receive the analog signals on the plurality of carrier frequencies, to demodulate the received signals into a bitstream, and to output the bitstream to the acquisition computer via the acquisition computer interface; and
      to perform a training sequence including to receive the known signal, and in response to receiving the known signal, determining an adjustment to the power-per-carrier; and
   c. a wireline cable providing an electrical connection between the downhole telemetry cartridge and the uphole telemetry unit, wherein the analog signals are transmitted in an uphole direction on the wireline cable;
   wherein the receiver further comprises logic operable to cause the transmission from the receiver to cable driver of a control signal indicative to the power level control circuitry to increase or decrease the transmission power for any carrier frequency; and
   wherein the training sequence is performed repeatedly during the course of a logging-job.

17. A telemetry system for transmitting well-logging data from at least one downhole tool to a surface data acquisition system, the at least one down hole tool having a first tool data input/output interface, the telemetry system comprising:
   a. a downhole telemetry cartridge connected to the at least one downhole tool via a second tool data input/output interface connected to the first tool data input/output interface, wherein the downhole telemetry cartridge receives a bitstream from the at least one downhole tool over the second input/output interface and comprising:
      a transmitter connected to the second tool data input/output interface, and having a logic operable to cause transmission of the bitstream as analog signals on a plurality of carrier frequencies; and
      a cable driver connected having transmission power level control circuitry having logic to control the total transmission power applied to the wireline cable;
   b. an uphole telemetry unit connected to the surface data acquisition system via an acquisition computer interface and comprising
      a receiver connected to the surface data acquisition system and having logic operable to receive the analog signals on the plurality of carrier frequencies, to demodulate the received signals into a bitstream, and to output the bitstream to the acquisition computer via the acquisition computer interface; and
   c. a wireline cable providing an electrical connection between the downhole telemetry cartridge and the uphole telemetry unit, wherein the analog signals are transmitted in an uphole direction on the wireline cable;
   wherein the receiver further comprises logic operable to cause the transmission from the receiver to cable driver of a control signal indicative to the transmission power level control circuitry to increase or decrease the total transmission power applied to the wireline cable.

18. A telemetry system for transmitting well-logging data from at least one downhole tool to a surface data acquisition system, the at least one down hole tool having a first tool data input/output interface, the telemetry system comprising:
   a. a downhole telemetry cartridge connected to the at least one downhole tool via a second tool data input/output interface connected to the first tool data input/output interface, wherein the downhole telemetry cartridge receives a bitstream from the at least one downhole tool over the second input/output interface and comprising:
      a transmitter connected to the second tool data input/output interface, and having a logic operable to cause transmission of the bitstream as analog signals on a plurality of carrier frequencies;
   b. an uphole telemetry unit connected to the surface data acquisition system via an acquisition computer interface and comprising
      a receiver connected to the surface data acquisition system and having logic operable to receive the analog signals on the plurality of carrier frequencies, to demodulate the received signals into a bitstream, and to output the bitstream to the acquisition computer via the acquisition computer interface; and
   c. a wireline cable providing an electrical connection between the downhole telemetry cartridge and the uphole telemetry unit, wherein the analog signals are transmitted in an uphole direction on the wireline cable;
   d. a tone ordering logic operable to divide the bit stream into bit groups such that there is a one-to-one mapping between bit groups and carrier frequencies;
   e. a downhole bits-per-carrier table containing a mapping between each bit group and the number of bits allocated to each carrier for each cycle of operation;
   f. a constellation encoder connected to receive the bit groups from the tone ordering logic and the bits-per-carrier from the bits-per-carrier table, and operable to encode the bit groups as complex numbers; and
   g. a training logic executed repeatedly during the course of a logging job and operable to populate the bits-per-carrier table.

19. The telemetry system of claim 18 wherein the training logic comprises a downhole training logic and an uphole training logic and
   wherein the downhole training logic comprises
      logic operable to transmit a known signal on each of a plurality of carriers; and
      logic operable to receive the number of bits-per-carrier from the uphole telemetry unit; and
   the uphole training logic comprises
      logic operable to measure the signal-to-noise ratio on the received known signals;
      logic operable to determine the number of bits-per-carrier as a function of the signal-to-noise ratio; and
      logic operable to cause the transmission of the number of bits-per-carrier to the downhole telemetry cartridge.

20. The telemetry system of claim 19 wherein the downhole telemetry cartridge further comprises logic to populate the downhole bit-per-carrier table with the received number of bits-per-carrier; and
   wherein the uphole telemetry unit further comprises an uphole bits-per-carrier table and a logic to populate the uphole bits-per-carrier table with the same number of bits-per-carrier.

21. The method of claim 18, wherein the downhole telemetry cartridge is integrated into one of the at least one downhole tool.

22. The system of claim 18, wherein the wireline cable is a heptacable.

23. The telemetry system of claim 18, wherein the downhole telemetry cartridge is constructed from components capable of operation at temperatures above 150 degrees Celsius.

24. A method of operating a well-logging telemetry system having a downhole telemetry cartridge and an uphole telemetry unit connected by a wireline cable, comprising:

executing a training sequence having the steps of:
transmitting a known signal on each of a plurality of carriers from the downhole telemetry cartridge to the uphole telemetry unit;
measuring at the uphole telemetry unit the signal-to-noise ratio on the known signal on each of the plurality of carriers;
using the signal-to-noise ratio measurement to determine the number of bits-per-constellation to use for each carrier; and
populating a bits-per-carrier table with the bits-per-constellation value for each carrier; and dynamically adjusting the bits-per-carrier table during the course of a logging job by re-transmitting the known signal on a subset of the plurality of carriers, re-measuring at the uphole telemetry unit the signal-to-noise ratio on each of the subset of plurality of carriers, using the re-measured signal-to-noise ratio on each of the subset of plurality of carrier to determine the number of bits-per-constellation to use for each of the subset of the plurality of carriers; and populating the bits-per-carrier table entries for each of the subset of the plurality of carriers with the bits-per-constellation value for each of the subset of the plurality of carriers.

25. The method of operating a well-logging telemetry system of claim 24, wherein the step of populating a bits-per-carrier table comprises:

populating a bits-per-carrier table in the uphole telemetry unit and populating a bits-per-carrier table in the downhole telemetry cartridge.

26. The method of operating a well-logging telemetry system of claim 24, further comprising:

acquiring well-log data from a well-logging tool; and
wherein at least one of the steps of transmitting a known signal on each of a plurality of carriers, measuring the signal-to-noise ratio on the known signal on each of the plurality of carriers, using the signal-to-noise ratio measurement to determine the number of bits-per-constellation to use for each carrier, and populating a bits-per-carrier table with the bits-per-constellation value for each carrier is executed concurrently with the step of acquiring well-log data.

27. The method of operating a well-logging telemetry system of claim 24 further comprising:

transmitting a known complex number from the downhole telemetry cartridge to the uphole telemetry unit;
receiving the transmitted complex number at the uphole telemetry unit;
dividing the received complex number by the known complex number thereby obtaining an adjustment parameter; and
using the adjustment parameter for time domain equalization.

28. The method of operating a well-logging telemetry system of claim 24, further comprising:

transmitting a known complex number from the downhole telemetry cartridge to the uphole telemetry unit;
receiving the transmitted complex number at the uphole telemetry unit;
dividing the received complex number by the known complex number thereby obtaining an adjustment parameter; and
using the adjustment parameter for frequency domain equalization.

29. The method of claim 24, wherein the wireline cable is a heptacable.

30. The method of claim 24 of operating a well-logging telemetry system having a downhole telemetry cartridge and an uphole telemetry unit connected by a wireline cable, wherein:

the re-transmission of the known signal on a subset of the plurality of carriers is performed periodically.

31. The method of claim 24 of operating a well-logging telemetry system having a downhole telemetry cartridge and an uphole telemetry unit connected by a wireline cable, wherein the re-transmission of the known signal on a subset of the plurality of carriers is performed in response to an observed condition.

32. The method of claim 31 of operating a well-logging telemetry system having a downhole telemetry cartridge and an uphole telemetry unit connected by a wireline cable, wherein the observed condition is selected from the set including the elements deterioration of overall signal-to-noise ratio and deterioration of effective data rate.

33. A method of operating a well-logging telemetry system having a downhole telemetry cartridge and an uphole telemetry unit connected by a wireline cable, comprising:

during the course of a logging job, repeatedly performing a training sequence including:
transmitting a signal of known power level on each of a plurality of carriers from the downhole telemetry cartridge to the uphole telemetry unit;
measuring the signal amplitude received on each carrier;
comparing the power level received on each carrier to a predetermined maximum power level for each carrier;
based on the comparison of power level, transmitting an indication to adjust the power level on at least one of the carriers from the uphole telemetry unit to the downhole telemetry cartridge;
adjusting the power level of at least one of the carriers based on the indication received.

34. The method of claim 33 of operating a well-logging telemetry system having a downhole telemetry cartridge and an uphole telemetry unit connected by a wireline cable, further comprising:

for each carrier that the power level may be increased without exceeding the predetermined maximum power level for the each carrier, determining whether an increase in power level would improve the bits-per-carrier for the each carrier and whether a decrease in power level would degrade the bits-per-carrier for the each carrier;

and wherein in the transmitting step, based on both the comparison of power level and determination of improvement or degradation in bits-per-carrier for at least one of the carriers, the indication to adjust the power level on the at least one of the carriers indicates to increase the power level if an improvement in number of bits-per-carrier may be achieved by a permissible increase in power and wherein the indication to adjust the power level on the at least one of the carriers indicates to lower the power level if there would be no degradation in the number of bits-per carrier by lowering the power level.

35. The method of claim 33 of operating a well-logging telemetry system having a downhole telemetry cartridge and an uphole telemetry unit connected by a wireline cable, wherein the training sequence is performed periodically.

36. The method of claim 35 of operating a well-logging telemetry system having a downhole telemetry cartridge and an uphole telemetry unit connected by a wireline cable, wherein the training sequence is performed in response to an observed condition.

37. The method of claim 35 of operating a well-logging telemetry system having a downhole telemetry cartridge and an uphole telemetry unit connected by a wireline cable, wherein the observed condition is selected from the set including the elements deterioration of overall signal-to-noise ratio and deterioration of effective data rate.

38. The method of claim 33 of operating a well-logging telemetry system having a downhole telemetry cartridge and an uphole telemetry unit connected by a wireline cable, wherein the using a training sequence to populate a bits-per-carrier table in the downhole telemetry cartridge and a bits-per-carrier table in the uphole telemetry unit performed in response to an observed condition.

39. The method of claim 38 of operating a well-logging telemetry system having a downhole telemetry cartridge and an uphole telemetry unit connected by a wireline cable, wherein the observed condition is selected from the set including the elements deterioration of overall signal-to-noise ratio and deterioration of effective data rate.

40. A method of operating a well-logging telemetry system having a downhole telemetry cartridge and an uphole telemetry unit connected by a wireline cable, comprising:
  modulating a bit stream onto a plurality of carrier frequencies;
  transmitting the modulated bit stream on a first propagation mode from the downhole telemetry cartridge to the uphole telemetry unit;
  operating the uphole telemetry unit to demodulate the received bitstream during the course of a logging job, repeatedly:
    using a training sequence to populate a bits-per-carrier table in the downhole telemetry cartridge and a bits-per-carrier table in the uphole telemetry unit;
  wherein the step of modulating the bit stream onto a plurality of carrier frequencies modulates the bit stream for each carrier according to values stored in the downhole bits-per-carrier table for such each carrier; and
  wherein the step of demodulating the bit stream demodulates the bit stream from each carrier according to values stored in the uphole bits-per-carrier table.

41. The method of claim 40, wherein the wireline cable is a heptacable.

42. The method of claim 40 of operating a well-logging telemetry system having a downhole telemetry cartridge and an uphole telemetry unit connected by a wireline cable, wherein:
  using a training sequence to populate a bits-per-carrier table in the downhole telemetry cartridge and a bits-per-carrier table in the uphole telemetry unit is performed periodically.

43. A method of operating a well-logging telemetry system having a downhole telemetry cartridge and an uphole telemetry unit connected by a wireline cable, comprising:
  modulating a bit stream onto a plurality of carrier frequencies;
  transmitting the modulated bit stream on a first propagation mode from the downhole telemetry cartridge to the uphole telemetry unit;
  operating the uphole telemetry unit to demodulate the received bitstream;
  during the course of a logging job, repeatedly:
    using a training sequence to populate a downhole gain table in the downhole telemetry cartridge and an uphole gain table in the uphole telemetry unit; and
    adjusting the gain on each carrier based on values stored in the downhole gain table.

44. The method of claim 43 of operating a well-logging telemetry system having a downhole telemetry cartridge and an uphole telemetry unit connected by a wireline cable, wherein:
  using a training sequence to populate a bits-per-carrier table in the downhole telemetry cartridge and a bits-per-carrier table in the uphole telemetry unit is performed periodically.

45. The method of claim 43 of operating a well-logging telemetry system having a downhole telemetry cartridge and an uphole telemetry unit connected by a wireline cable, wherein the using a training sequence to populate a bits-per-carrier table in the downhole telemetry cartridge and a bits-per-carrier table in the uphole telemetry unit performed in response to an observed condition.

46. The method of claim 45 of operating a well-logging telemetry system having a downhole telemetry cartridge and an uphole telemetry unit connected by a wireline cable, wherein the observed condition is selected from the set including the elements deterioration of overall signal-to-noise ratio and deterioration of effective data rate.

* * * * *

UNITED STATES PATENT AND TRADEMARK OFFICE
CERTIFICATE OF CORRECTION

| | | |
|---|---|---|
| PATENT NO. | : 7,787,525 B1 | Page 1 of 1 |
| APPLICATION NO. | : 09/471659 | |
| DATED | : August 31, 2010 | |
| INVENTOR(S) | : Lloyd D. Clark, Jr. et al. | |

It is certified that error appears in the above-identified patent and that said Letters Patent is hereby corrected as shown below:

In Col. 20, ln. 59, claim 21 REPLACE "method" with -- system --

Signed and Sealed this
Fifth Day of June, 2012

David J. Kappos
*Director of the United States Patent and Trademark Office*